(12) United States Patent
Zhang et al.

(10) Patent No.: US 12,131,128 B2
(45) Date of Patent: Oct. 29, 2024

(54) TRANSLATION QUALITY DETECTION METHOD AND APPARATUS, MACHINE TRANSLATION SYSTEM, AND STORAGE MEDIUM

(71) Applicant: HUAWEI TECHNOLOGIES CO., LTD., Shenzhen (CN)

(72) Inventors: Meng Zhang, Shenzhen (CN); Qun Liu, Hong Kong (CN); Xin Jiang, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 17/479,420

(22) Filed: Sep. 20, 2021

(65) Prior Publication Data

US 2022/0004721 A1  Jan. 6, 2022

Related U.S. Application Data

(63) Continuation of application No. PCT/CN2020/079964, filed on Mar. 18, 2020.

(30) Foreign Application Priority Data

Mar. 27, 2019 (CN) .......................... 201910237160.0

(51) Int. Cl.
G06F 40/58 (2020.01)
(52) U.S. Cl.
CPC ................................. *G06F 40/58* (2020.01)

(58) Field of Classification Search
CPC ..................................................... G06F 40/58
See application file for complete search history.

(56) References Cited

U.S. PATENT DOCUMENTS

| 2012/0209587 | A1  | 8/2012  | Tanaka et al. |
| 2016/0124944 | A1  | 5/2016  | Andreoli et al. |
| 2019/0108222 | A1* | 4/2019  | Anglin ................ G06F 40/58 |
| 2019/0236147 | A1* | 8/2019  | Lee .................... G06F 40/47 |
| 2019/0332678 | A1* | 10/2019 | Ishida ................. G06F 40/279 |

FOREIGN PATENT DOCUMENTS

| CN | 103714054 A | 4/2014 |
| CN | 104731777 A | 6/2015 |
| CN | 106649282 A | 5/2017 |
| CN | 108829684 A | 11/2018 |

(Continued)

OTHER PUBLICATIONS

Chen Zhiming, Sentence-Level Machine Translation Quality Estimation Based on Neural Network Features, 2019, 2 pages (abstract).

(Continued)

*Primary Examiner* — Bryan S Blankenagel
(74) *Attorney, Agent, or Firm* — HAUPTMAN HAM, LLP

(57) ABSTRACT

A translation quality detection method includes obtaining a source text and a machine translation of the source text. The machine translation is obtained after a machine translation system translates the source text. The method also includes determining a translation quality of the machine translation based on the source text, the machine translation, and an application scenario of the machine translation.

17 Claims, 13 Drawing Sheets

(56) References Cited

FOREIGN PATENT DOCUMENTS

| CN | 109062912 A | 12/2018 |
|---|---|---|
| CN | 110083842 A | 8/2019 |

OTHER PUBLICATIONS

Tan Yiming, Neural Post-Editing Based on Machine Translation Quality Estimation, 2018, 9 pages.
Chinese Office Action issued in corresponding Chinese Application No. 201910237160.0, dated Sep. 2, 2022, pp. 1-7.
Lucia Specia et al., "Estimating the Sentence-Level Quality of Machine Translation Systems", In 13th Conference of the European Association for Machine Translation, Barcelona, May 2009, total: 8 pages.
Matthew Snover et al., "A study of translation edit rate with targeted human annotation", In Proceedings of association for machine translation in the Americas, total: 9 pages.
Julia Ive et al., "deepQuest: A Framework for Neural-based Quality Estimation", Proceedings of the 27th International Conference on Computational Linguistics, Santa Fe, New Mexico, USA, Aug. 20-26, 2018, total: 12 pages.
International Search Report issued in corresponding International Application No. PCT/CN2020/079964, dated Jun. 23, 2020, pp. 1-11.

* cited by examiner

TRANSLATION QUALITY DETECTION METHOD AND APPARATUS, MACHINE TRANSLATION SYSTEM, AND STORAGE MEDIUM

CROSS-REFERENCE TO RELATED APPLICATIONS

This application is a continuation of International Application No. PCT/CN2020/079964, filed on Mar. 18, 2020, which claims priority to Chinese Patent Application No. 201910237160.0, filed on Mar. 27, 2019. The disclosures of the aforementioned applications are hereby incorporated by reference in their entireties.

TECHNICAL FIELD

This application relates to the field of machine translation technologies, and in particular, to a translation quality detection method and apparatus, a machine translation system, and a storage medium.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand essence of intelligence and produce a new intelligent machine that can react in a manner similar to the human intelligence. The artificial intelligence is to study design principles and implementation methods of various intelligent machines, so that the machines have perceiving, reasoning, and decision-making functions.

With continuous development of artificial intelligence technologies, a natural language human-computer interaction system that enables human-computer interaction by using a natural language becomes increasingly important. The human-computer interaction by using the natural language requires the system to recognize specific meanings of the human natural language. Usually, the system extracts key information from a natural language sentence to recognize a specific meaning of the sentence.

With rapid development of machine translation technologies, machine translation has been more widely used. However, a translation obtained through the machine translation still has problems such as poor translation quality and low precision. Therefore, how to detect translation quality of the machine translation is a problem to be resolved.

A conventional solution is to perform manual editing on a machine translation to obtain a manually edited machine translation (equivalent to a relatively precise translation), and then analyze a difference between the machine translation and the manually edited translation, to determine translation quality of the machine translation. In the conventional solution, a manner of determining translation quality by simply comparing a difference between a machine translation and a manually edited translation is relatively simple and single, and efficiency of translation quality detection is not high.

SUMMARY

This application provides a translation quality detection method and apparatus, a machine translation system, and a storage medium, so that machine translation quality detection can be more targeted, and therefore efficient.

According to a first aspect, a translation quality detection method is provided. The method includes: obtaining a source text and a machine translation of the source text, and determining translation quality of the machine translation based on the source text, the machine translation, and an application scenario of the machine translation.

The machine translation is a translation obtained after a machine translation system translates the source text. In other words, the machine translation is a translation obtained after the machine translation system performs machine translation on the source text.

It should be understood that the translation quality detection method in this application may be performed by a translation quality detection apparatus or a translation quality detection system.

Both the source text and the machine translation may belong to a natural language that generally evolves with a culture in a natural way.

Optionally, the source text belongs to a first natural language, the machine translation belongs to a second natural language, and the first language and the second language are different types of natural languages.

That the source text belongs to a first natural language may mean that the source text is a segment of text expressed by using the first natural language, and that the machine translation belongs to a second natural language may mean that the machine translation is a segment of text expressed by using the second natural language. The source text and the machine translation may belong to any two different natural languages.

The application scenario of the machine translation may be an application scenario of a downstream system that subsequently processes the machine translation, and the application scenario of the downstream system may specifically be a processing task of the downstream system.

Optionally, the processing task of the downstream system is for one or more of the following purposes: sentiment classification, spam detection, intent recognition, or named entity recognition.

In this application, the translation quality of the machine translation is determined with reference to the application scenario of the machine translation, so that translation quality detection of the machine translation can be more targeted and therefore efficient.

With reference to the first aspect, in some implementations of the first aspect, the determining translation quality of the machine translation based on the source text, the machine translation, and an application scenario of the machine translation includes: processing the source text and the machine translation by using a translation quality detection model corresponding to the downstream system, to obtain the translation quality of the machine translation.

The downstream system is configured to perform subsequent processing on the machine translation, the translation quality detection model corresponding to the downstream system is obtained through training based on a training sample and a training target, the training sample includes a training source text and a training machine translation, and the training target includes translation quality of the training machine translation.

The training source text may be a text specially used to train the translation quality detection model, and the training source text may include a plurality of segments of texts. The training machine translation is a translation obtained after the machine translation system translates the training source text (the training machine translation is a translation obtained after the machine translation system performs machine translation on the training source text), and the translation quality of the training machine translation is determined based on a difference between a first processing result and a second processing result. The first processing result is a processing result obtained after the downstream system processes the training machine translation, and the second processing result is a processing result obtained after the downstream system processes a reference translation of the training source text.

It should be understood that, in this application, during processing of the source text and the machine translation by using a translation quality detection model corresponding to the downstream system, the application scenario of the machine translation is considered, so that translation quality detection of the machine translation can be more targeted and therefore efficient.

The translation quality detection model corresponding to the downstream system may be a pre-trained model. During detection of the translation quality, the translation quality detection model corresponding to the downstream system (which subsequently processes the machine translation) is used to detect the translation quality.

The training source text, the training machine translation, and the translation quality of the training machine translation may be collectively referred to as training data. The translation quality detection model is trained by using the training data, to obtain a model parameter of the translation quality detection model and a trained translation quality detection model. The trained translation quality detection model may process the source text and the machine translation, to obtain the translation quality of the machine translation.

In this application, the source text and the machine translation are processed by using the trained translation quality detection model, to improve efficiency of translation detection.

With reference to the first aspect, in some implementations of the first aspect, the training source text and the reference translation of the training source text come from a known bilingual parallel corpus.

The known bilingual parallel corpus may come from a bilingual parallel corpus stored locally, or may come from a bilingual parallel corpus stored on a cloud.

A large amount of training data can be obtained by obtaining the source text and the reference translation of the source text from the known bilingual parallel corpus. This reduces difficulty in obtaining the training data, and further simplifies a process of obtaining the translation quality detection model based on the training data.

Optionally, the reference translation of the training source text is a manually edited translation.

Usually, because an editor has an ability to ensure precision of a reference translation. When quantities of reference translations are the same, a more precise reference translation can make the translation quality detection model more accurate. Therefore, after the training source text is obtained, the reference translation of the training source text is obtained through manual editing, so that a precise reference translation can be obtained. This helps obtain a more accurate translation quality detection model subsequently.

With reference to the first aspect, in some implementations of the first aspect, the translation quality of the machine translation is acceptability information of the machine translation.

The acceptability information of the machine translation may indicate an acceptable degree of the machine translation. A higher acceptable degree of the machine translation indicates higher quality of the machine translation. On the contrary, a lower acceptable degree of the machine translation indicates lower quality of the machine translation.

Optionally, the translation quality of the machine translation may be indicated by a difference value between the machine translation and a standard reference translation.

A larger difference value between the machine translation and the standard reference translation indicates lower quality of the machine translation. A smaller difference value between the machine translation and the standard reference translation indicates higher quality of the machine translation.

With reference to the first aspect, in some implementations of the first aspect, the acceptability information of the machine translation is used to indicate whether the machine translation is acceptable.

In this case, the acceptability information of the machine translation may include a flag bit, and a value of the flag bit is used to indicate whether the machine translation is acceptable. For example, when the value of the flag bit is 1, it indicates that the machine translation is acceptable (the machine translation may be sent to the downstream system for processing). When the value of the flag bit is 0, it indicates that the machine translation cannot be accepted or the machine translation is not accepted (that is, the machine translation cannot be sent to the downstream system for processing).

With reference to the first aspect, in some implementations of the first aspect, the acceptability information of the machine translation is used to indicate a probability that the machine translation is accepted or a probability that the machine translation is not accepted.

The acceptability information of the machine translation may specifically be a value of the probability that the machine translation is accepted or a value of the probability that the machine translation is not accepted.

With reference to the first aspect, in some implementations of the first aspect, the translation quality detection model is a neural network model.

In this application, when the translation quality detection model is a neural network model, an effect of obtaining the translation quality by processing the source text and the machine translation is better.

Optionally, the translation quality detection model is a model based on a support vector machine.

According to a second aspect, a translation quality detection apparatus is provided. The apparatus includes modules configured to perform the method in the first aspect.

According to a third aspect, a machine translation system is provided. The machine translation system includes a machine translation apparatus and the translation quality detection apparatus in the second aspect. The machine translation apparatus is configured to obtain a source text and translate the source text, to obtain a machine translation. The translation quality detection apparatus is configured to detect the machine translation, to obtain translation quality of the machine translation.

Optionally, that the translation quality detection apparatus is configured to detect the machine translation, to obtain translation quality of the machine translation includes: the translation quality detection apparatus is configured to determine the translation quality of the machine translation based on the source text, the machine translation, and an application scenario of the machine translation.

According to a fourth aspect, a cross-lingual natural language processing system is provided. The system includes: a machine translation apparatus, configured to obtain a source text, and translate the source text to obtain a machine translation; a translation quality detection apparatus, configured to determine translation quality of the machine translation based on the source text, the machine translation, and an application scenario of the machine translation; and a downstream system, configured to process the machine translation when the translation quality of the machine translation meets a preset requirement.

The translation quality detection apparatus, the machine translation system, or the cross-lingual natural language processing system may be an electronic device (or a module located in an electronic device), and the electronic device may specifically be a mobile terminal (for example, a smartphone), a computer, a personal digital assistant, a wearable device, a vehicle-mounted device, an internet of things device, or another device that can perform natural language processing.

According to a fifth aspect, a computer-readable medium is provided. The computer-readable medium stores program code used by a device for execution, and the program code includes instructions used to perform the method in the first aspect.

According to a sixth aspect, a computer program product including instructions is provided. When the computer program product is run on a computer, the computer is enabled to perform the method in the first aspect.

According to a seventh aspect, a chip is provided. The chip includes a processor and a data interface, and the processor reads, through the data interface, instructions stored in a memory, to perform the method in the first aspect.

Optionally, in an implementation, the chip may further include the memory. The memory stores the instructions, the processor is configured to execute the instructions stored in the memory, and when executing the instructions, the processor is configured to perform the method in the first aspect.

According to an eighth aspect, an electronic device is provided. The electronic device includes the translation quality detection apparatus in the second aspect, the machine translation system in the third aspect, or the cross-lingual natural language processing system in the fourth aspect.

DESCRIPTION OF EMBODIMENTS

The following describes technical solutions in this application with reference to the accompanying drawings.

Figure 1:
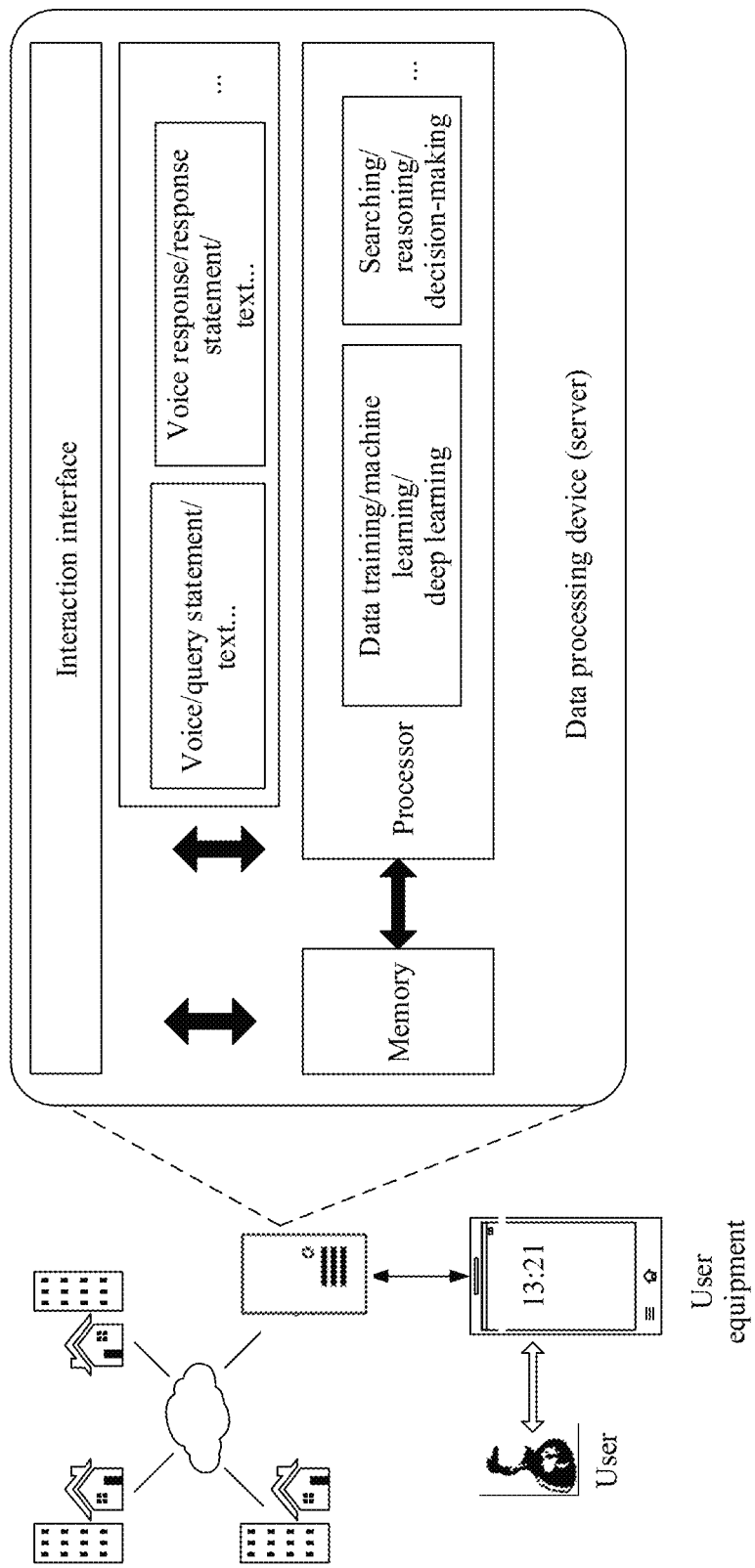
FIG. 1 is a schematic diagram of an application scenario of natural language processing according to an embodiment of this application.
Figure 2:
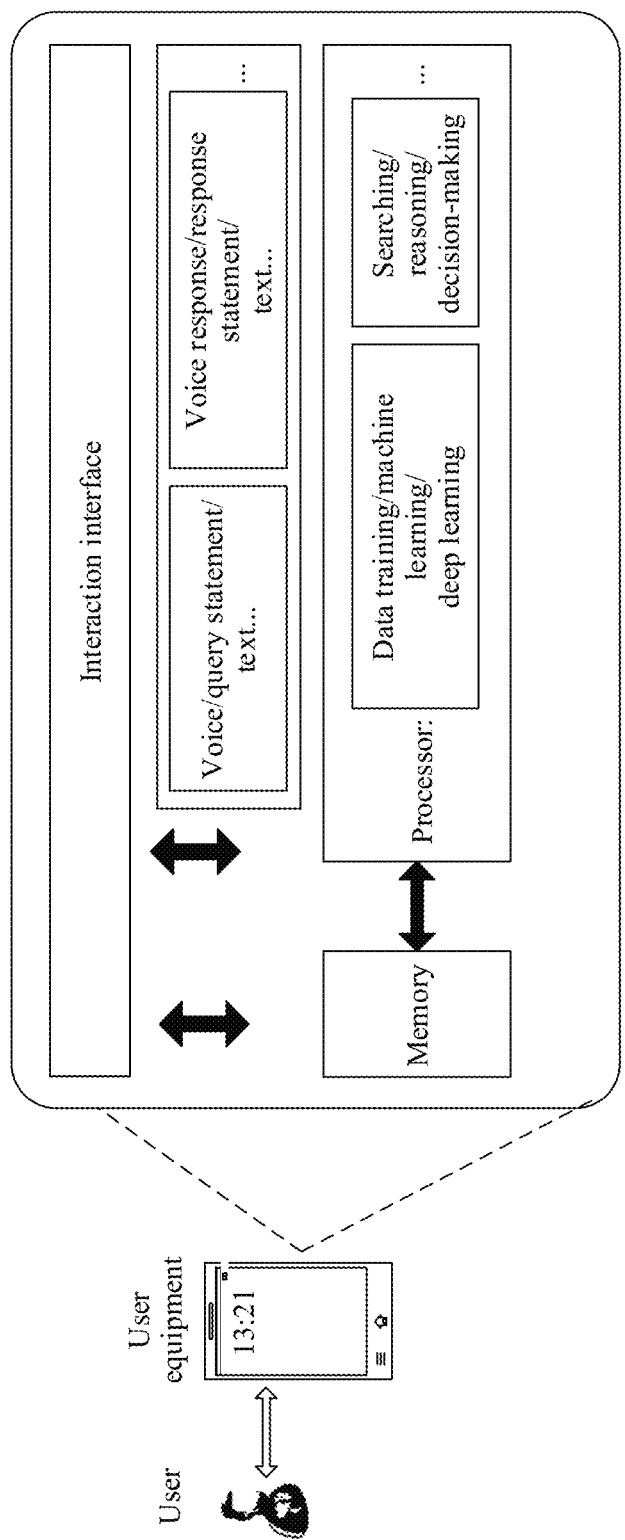
FIG. 2 is a schematic diagram of another application scenario of natural language processing according to an embodiment of this application.
Figure 3:
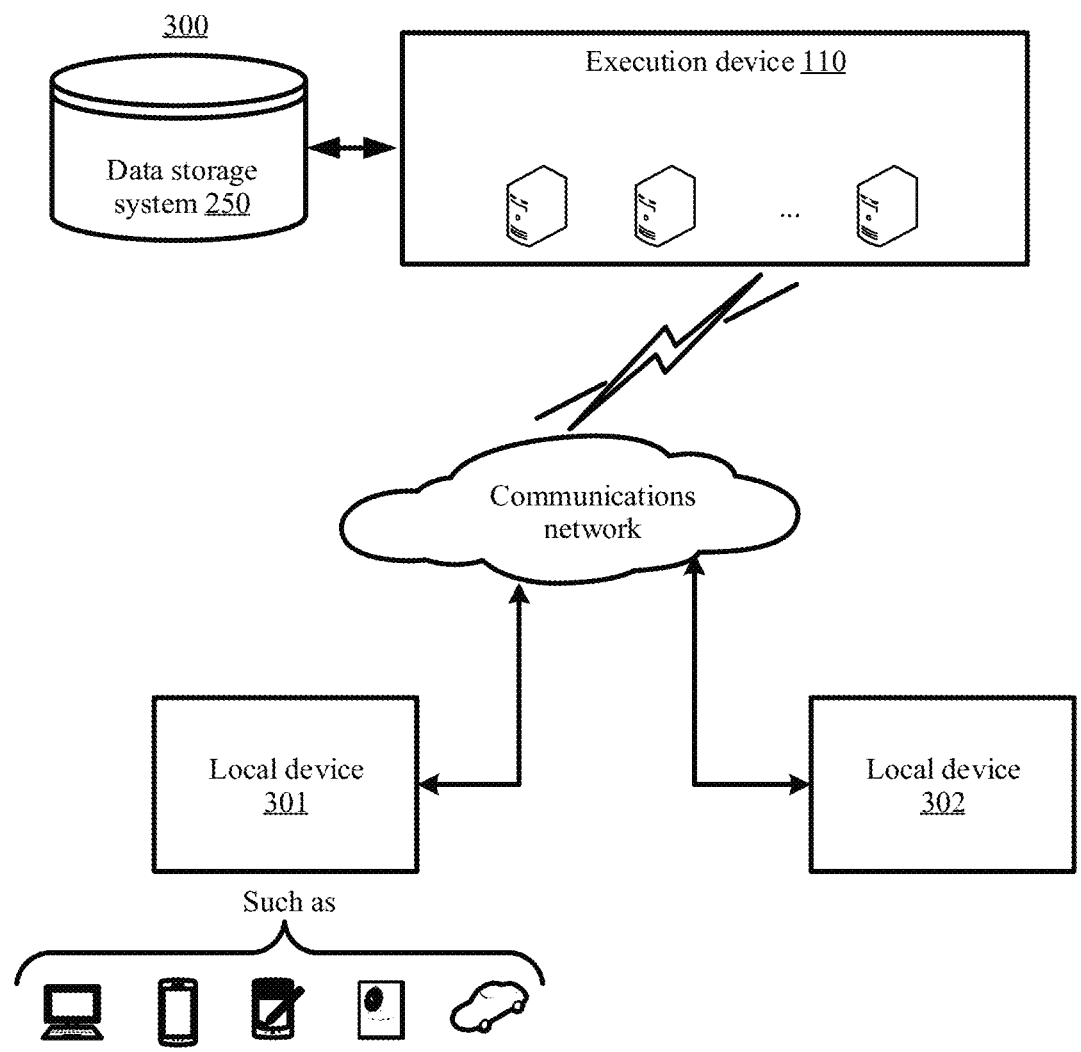
FIG. 3 is a schematic diagram of a device related to natural language processing according to an embodiment of this application.

To facilitate understanding of the solutions in embodiments of this application, the following describes a possible application scenario in the embodiments of this application with reference to FIG. 1 to FIG. 3.

FIG. 1 shows a natural language processing system. The natural language processing system includes user equipment and a data processing device. The user equipment includes an intelligent terminal such as a mobile phone, a personal computer, or an information processing center. The user equipment is an initiating end of natural language data processing. As an initiator of a request for language questioning and answering, querying, or the like, a user usually initiates the request by using the user equipment.

The data processing device may be a device or a server with a data processing function, such as a cloud server, a network server, an application server, or a management server. The data processing device receives, through an interaction interface, a question of a query statement, voice, text, or the like from the intelligent terminal, and then performs language data processing by using a memory storing data and a processor processing data in a manner of machine learning, deep learning, searching, reasoning, decision-making, or the like. The memory in the data processing device may be a general name, including a local memory and a database storing historical data. The database may be in the data processing device, or may be in another network server.

In the natural language processing system shown in FIG. 1, the user equipment may receive instructions from the user, to perform machine translation on a source text (for example, the source text may be a segment of English text input by the user) to obtain a machine translation, and then to initiate a request to the data processing device, so that the data processing device performs translation quality detection on the machine translation obtained by the user equipment through translation, to obtain translation quality of the machine translation.

In FIG. 1, the data processing device may perform a translation quality detection method according to an embodiment of this application.

FIG. 2 shows another natural language processing system. In FIG. 2, user equipment is directly used as a data processing device. The user equipment can directly receive an input from a user, and the input is directly processed by using hardware of the user equipment. A specific process is similar to that in FIG. 1. For details, refer to the foregoing descriptions. Details are not described herein again.

In the natural language processing system shown in FIG. 2, the user equipment may receive instructions from the user, to perform machine translation on a source text to obtain a machine translation, and then to perform translation quality detection on the machine translation obtained by the user equipment through machine translation, to obtain translation quality of the machine translation.

In FIG. 2, the user equipment may perform a translation quality detection method according to an embodiment of this application.

FIG. 3 is a schematic diagram of a device related to natural language processing according to an embodiment of this application.

The user equipment in FIG. 1 and FIG. 2 may specifically be a local device 301 or a local device 302 in FIG. 3, and the data processing device in FIG. 1 may specifically be an execution device 110 in FIG. 3. A data storage system 250 may store to-be-processed data of the execution device 110. The data storage system 250 may be integrated on the execution device 110, or may be disposed on a cloud or another network server.

The processor in FIG. 1 and FIG. 2 may perform data training/machine learning/deep learning by using a neural network model or another model (for example, a model based on a support vector machine), and detect translation quality of a machine translation by using a model obtained through data training or learning, to obtain the translation quality of the machine translation.

Because the embodiments of this application relate to massive application of a neural network, for ease of understanding, the following describes terms and concepts related to the neural network that may be used in the embodiments of this application.

(1) Neural Network

The neural network may include a neuron. The neuron may be an operation unit that uses $x_s$ and an intercept of 1 as an input, where an output of the operation unit may be as follows:

$$h_{W,b}(x) = f(W^T x) = f\left(\sum_{s=1}^{n} W_s x_s + b\right) \quad (1\text{-}1)$$

Herein, s=1, 2, ..., or n, n is a natural number greater than 1, $W_s$ is a weight of $x_s$, b is a bias of the neuron, and f is an activation function (activation function) of the neuron, used to introduce a non-linear feature into the neural network, to convert an input signal in the neuron into an output signal. The output signal of the activation function may be used as an input of a next convolutional layer, and the activation function may be a sigmoid function. The neural network is a network formed by connecting many single neurons together. An output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (deep neural network, DNN) is also referred to as a multi-layer neural network, and may be understood as a neural network with a plurality of hidden layers. The DNN is divided based on locations of different layers, and a neural network in the DNN may be divided into three types: an input layer, a hidden layer, and an output layer. Usually, the first layer is the input layer, the last layer is the output layer, and the middle layer is the hidden layer. Layers are fully connected. Any neuron at the $i^{th}$ layer is definitely connected to any neuron at the $(i+1)^{th}$ layer.

Although the DNN seems complex, the DNN is actually not complex in terms of work at each layer, and is simply represented as the following linear relationship expression: $\vec{y} = \alpha(W\vec{x} + \vec{b})$, where $\vec{x}$ is an input vector, $\vec{y}$ is an output vector, $\vec{b}$ is a bias vector, W is a weight matrix (which is also referred to as a coefficient), and $\alpha()$ is an activation function. At each layer, the output vector $\vec{y}$ is obtained by performing such a simple operation on the input vector $\vec{x}$. Because there are a plurality of layers in the DNN, there are also a plurality of coefficients W and a plurality of bias vectors $\vec{b}$. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4.

In conclusion, a coefficient from the $k^{th}$ neuron at the $(L-1)^{th}$ layer to the $j^{th}$ neuron at the $L^{th}$ layer is defined as $W_{jk}^L$.

It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. A process of training the deep neural network is a process of learning a weight matrix, and a final objective of training is to obtain weight matrices (weight matrices formed by vectors W at many layers) of all layers of a trained deep neural network.

(3) Convolutional Neural Network

The convolutional neural network (convolutional neuron network, CNN) is a deep neural network with a convolutional structure. The convolutional neural network includes a feature extractor including a convolutional layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) Recurrent Neural Network

The recurrent neural network (recurrent neural network, RNN) is used to process sequence data. In a conventional neural network model, from an input layer to a hidden layer and then to an output layer, the layers are fully connected, and nodes at each layer are not connected. Such a common neural network resolves many problems, but is still incapable of resolving many other problems. For example, if a word in a sentence is to be predicted, a previous word is usually used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. Nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN.

Now that there is a convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: I like traveling, and my favorite place is Yunnan. I will go if there is a chance. Herein, people should know that the person will go to "Yunnan". A reason is that the people can deduce the answer based on content of the context. However, how can a machine do this? The RNN emerges. The RNN is intended to make the machine capable of memorizing like a human. Therefore, an output of the RNN depends on current input information and historical memorized information.

(5) Loss Function

In a process of training a deep neural network, because it is expected that an output of the deep neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value that is quite close to the target value that is actually expected. Therefore, "how to obtain, through comparison, the difference between the predicted value and the target value" should be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

A neural network may use an error back propagation (back propagation, BP) algorithm to correct a value of a parameter in an initial neural network model in a training process, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

Figure 4:
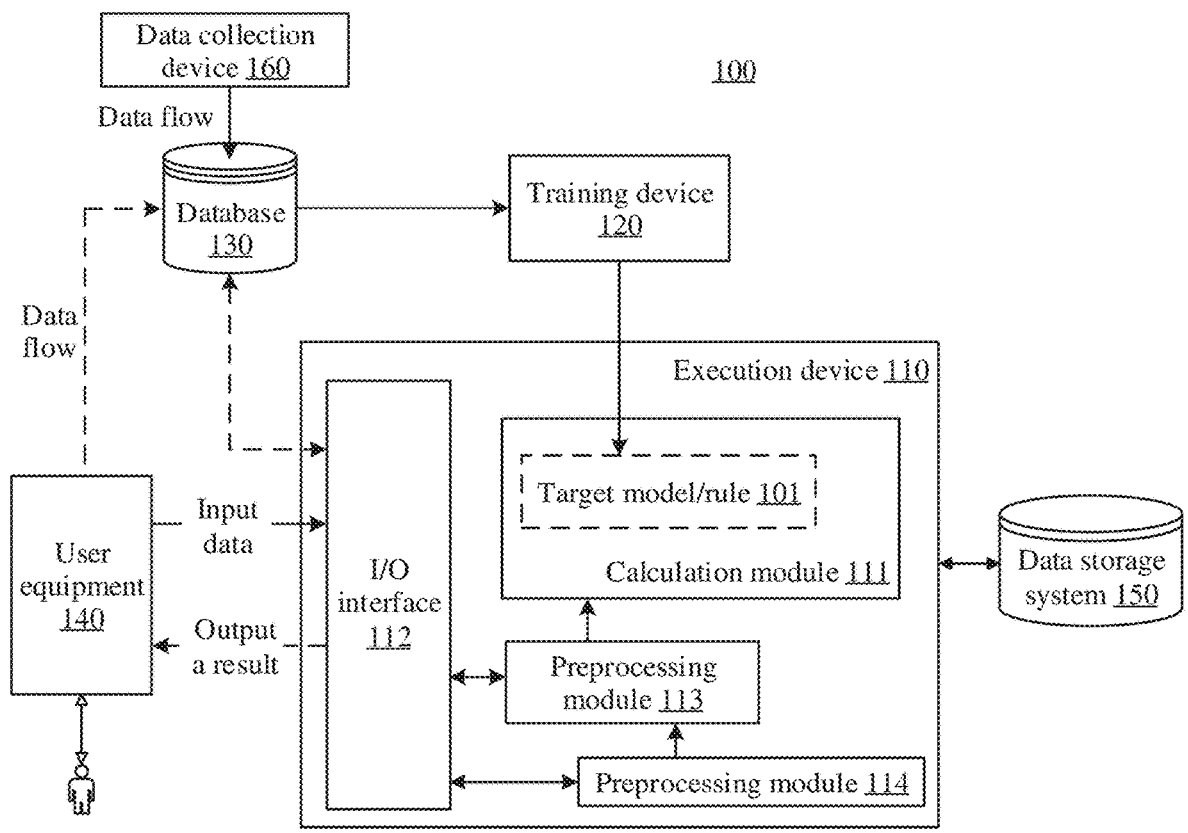
FIG. 4 is a schematic diagram of a system architecture according to an embodiment of this application.

FIG. 4 shows a system architecture 100 according to an embodiment of this application. In FIG. 4, a data collection device 160 is configured to collect training data. In this embodiment of this application, the training data includes a training source text, a training machine translation (which is a translation obtained after a machine translation system translates the training source text), and translation quality of the training machine translation. The translation quality of the training machine translation may be determined by a difference between a processing result obtained after the training machine translation is processed by a downstream system to which a machine translation is applied and a processing result obtained after a training reference translation is processed by the downstream system. The downstream system may be located inside a client device or located in another device outside user equipment.

After collecting the training data, the data collection device 160 stores the training data in a database 130, and a training device 120 obtains a target model/rule 101 through training based on the training data maintained in the database 130.

The following describes a case in which the training device 120 obtains the target model/rule 101 based on the training data. The training device 120 processes an input training source text and training machine translation, and compares quality of an output translation with translation quality of the training machine translation, until a difference between the quality of the translation output by the training device 120 and the translation quality of the training machine translation is less than a specific threshold, to complete training of the target model/rule 101.

The target model/rule 101 may be configured to implement a translation quality detection method according to an embodiment of this application. A source text and a machine translation are preprocessed (a preprocessing module 113 and/or a preprocessing module 114 may be used for preprocessing), and then input to the target model/rule 101, to obtain translation quality of the machine translation. The target model/rule 101 in this embodiment of this application may specifically be a neural network. It should be noted that, in an actual application, the training data maintained in the database 130 is not necessarily all collected by the data collection device 160, and may be received from another device. In addition, it should be noted that the training device 120 does not necessarily perform training completely based on the training data maintained in the database 130 to obtain the target model/rule 101, but may obtain training data from a cloud or another place to perform model training. The foregoing description shall not constitute any limitation on this embodiment of this application.

The target model/rule 101 obtained through training by the training device 120 may be applied to different systems or devices, for example, an execution device 110 shown in FIG. 4. The execution device 110 may be a terminal, for example, a mobile phone terminal, a tablet, a laptop computer, augmented reality (augmented reality, AR)/virtual reality (virtual reality, VR), or a vehicle-mounted terminal, or may be a server, a cloud, or the like. In FIG. 4, the execution device 110 configures an input/output (input/output, I/O) interface 112, configured to exchange data with an external device. A user may input data to the I/O interface 112 by using a client device 140, where the input data in this embodiment of this application may include a source text input by the client device and a machine translation.

The preprocessing module 113 and the preprocessing module 114 are configured to preprocess (which may specifically be processing a source text and a machine translation to obtain a word vector) based on the input data (for example, the source text and the machine translation) received by the I/O interface 112. In this embodiment of this application, the preprocessing module 113 and the preprocessing module 114 may alternatively not exist (or only one of the preprocessing modules exist), and a computing module 111 is directly configured to process the input data.

In a process in which the execution device 110 preprocesses the input data, or in a process in which the computing module 111 of the execution device 110 performs computing, the execution device 110 may invoke data, code, and the like in a data storage system 150 for corresponding processing, and may further store, in the data storage system 150, data, an instruction, and the like that are obtained through the corresponding processing.

Finally, the I/O interface 112 feeds back a processing result, for example, the translation quality of the machine translation, to the client device 140.

It should be noted that the training device 120 may generate, for different downstream systems, a target model/rule 101 corresponding to the downstream system, and the corresponding target model/rule 101 may be configured to implement the foregoing target or complete the foregoing task, to provide a result for the user.

In a case shown in FIG. 4, the user may manually input data (for example, inputting a segment of text), and the user may input the data on an interface provided by the I/O interface 112. In another case, the client device 140 may automatically send input data (for example, inputting a segment of text) to the I/O interface 112. If the client device 140 is to be authorized by the user to automatically send the input data, the user may set a corresponding permission in the client device 140. The user may view, on the client device 140, a result output by the execution device 110. Specifically, the result may be presented in a form such as display, sound, or an action (for example, the output result may be whether the machine translation is acceptable). The client device 140 may alternatively be used as a data collection end, to collect the input data that is input to the I/O interface 112 and the output result that is output from the I/O interface 112 in the figure, use the input data and the output result as new sample data, and store the new sample data in the database 130. It is clear that the client device 140 may alternatively not perform collection. Instead, the I/O interface 112 directly stores, in the database 130 as new sample data, the input data that is input to the I/O interface 112 and the output result that is output from the I/O interface 112 in the figure.

It should be noted that FIG. 4 is only a schematic diagram of the system architecture according to this embodiment of this application. A location relationship between a device, a component, a module, and the like shown in the figure constitutes no limitation. For example, in FIG. 4, the data storage system 150 is an external memory relative to the execution device 110. In another case, the data storage system 150 may alternatively be disposed in the execution device 110.

As shown in FIG. 4, the target model/rule 101 is obtained through training by the training device 120. The target model/rule 101 may be a translation quality detection model in this embodiment of this application. Specifically, the neural network provided in this embodiment of this application may be a CNN, a deep convolutional neural network (deep convolutional neural network, DCNN), a recurrent neural network (recurrent neural network, RNN), or the like.

Figure 5:
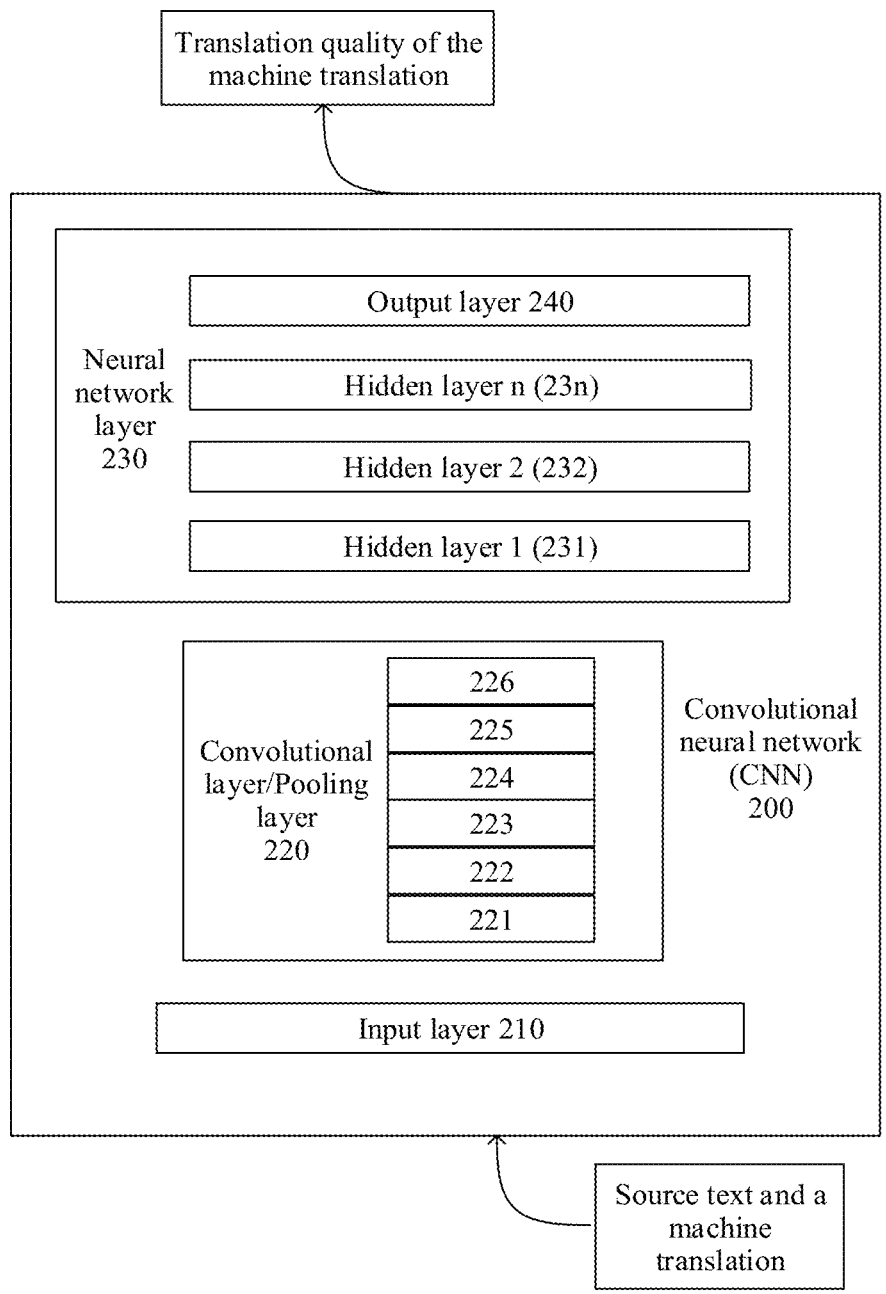
FIG. 5 is a schematic diagram of performing translation quality detection based on a CNN model according to an embodiment of this application.

Because the CNN is a common neural network, the following mainly describes a structure of the CNN in detail with reference to FIG. 5. As described in the foregoing basic concepts, a convolutional neural network is a deep neural network with a convolutional structure, and is a deep learning (deep learning) architecture. In the deep learning architecture, multi-layer learning is performed at different abstract levels by using a machine learning algorithm. As a deep learning architecture, the CNN is a feed-forward (feed-forward) artificial neural network. Neurons in the feed-forward artificial neural network may respond to an input picture.

As shown in FIG. 5, a convolutional neural network (CNN) 200 may include an input layer 210, a convolutional layer/pooling layer 220 (the pooling layer is optional), and a neural network layer 230. The following describes the layers in detail.

Convolutional Layer/Pooling Layer 220:

Convolutional Layer:

As shown in FIG. 5, for example, the convolutional layer/pooling layer 220 may include layers 221 to 226. In an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layer 221 and the layer 222 are convolutional layers, the layer 223 is a pooling layer, the layer 224 and the layer 225 are convolutional layers, and the layer 226 is a pooling layer. An output of a convolutional layer may be used as an input of a subsequent pooling layer, or may be used as an input of another convolutional layer to continue to perform a convolution operation.

The convolutional layer 221 is used as an example. The convolutional layer 221 may include a plurality of convolution operators. The convolution operator is also referred to as a kernel. In natural language processing, the convolution operator functions as a filter that extracts specific information from input voice or semantic information. The convolution operator may be a weight matrix essentially, and the weight matrix is usually predefined.

Weight values in weight matrices are obtained through massive training in an actual application. Each weight matrix formed by using the weight values obtained through training may be used to extract information from the input voice, to enable the convolutional neural network 200 to perform correct prediction.

When the convolutional neural network 200 has a plurality of convolutional layers, a relatively large quantity of general features are usually extracted at an initial convolutional layer (for example, the layer 221). The general feature may also be referred to as a low-level feature. As a depth of the convolutional neural network 200 increases, a feature extracted at a subsequent convolutional layer (for example, the layer 226) is more complex, for example, a high-level semantic feature. A feature with higher semantics is more applicable to a to-be-resolved problem.

Pooling Layer:

Because a quantity of training parameters is usually reduced, a pooling layer is usually periodically introduced after a convolutional layer. For the layers 221 to 226 in the layer 220 the shown in FIG. 5, one convolutional layer may be followed by one pooling layer, or a plurality of convolutional layers may be followed by one or more pooling layers. During natural language data processing, the pooling layer is only used to reduce a space size of data.

Neural Network Layer 230

After processing is performed at the convolutional layer/pooling layer 220, the convolutional neural network 200 still cannot output requested output information. As described above, at the convolutional layer/pooling layer 220, only a feature is extracted, and a parameter resulting from input data is reduced. However, to generate final output information (required class information or other related information), the convolutional neural network 200 uses the neural network layer 230 to generate an output of one class or outputs of a group of classes. Therefore, the neural network layer 230 may include a plurality of hidden layers (231, 232, . . . , and 23n shown in FIG. 5) and an output layer 240. Parameters included in the plurality of hidden layers may be obtained through pre-training based on related training data of a specific task type. For example, the task type may include voice or semantic recognition, classification, generation, or the like.

At the neural network layer 230, the plurality of hidden layers are followed by the output layer 240, that is, the last layer of the entire convolutional neural network 200. The output layer 240 has a loss function similar to a categorical cross entropy, and the loss function is specifically configured to calculate a prediction error. Once forward propagation (for example, propagation from 210 to 240 in FIG. 5 is forward propagation) of the entire convolutional neural network 200 is completed, reverse propagation (for example, propagation from 240 to 210 in FIG. 5 is reverse propagation) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 5 is merely an example convolutional neural network. In a specific application, the convolutional neural network may alternatively exist in a form of another network model.

Figure 6:
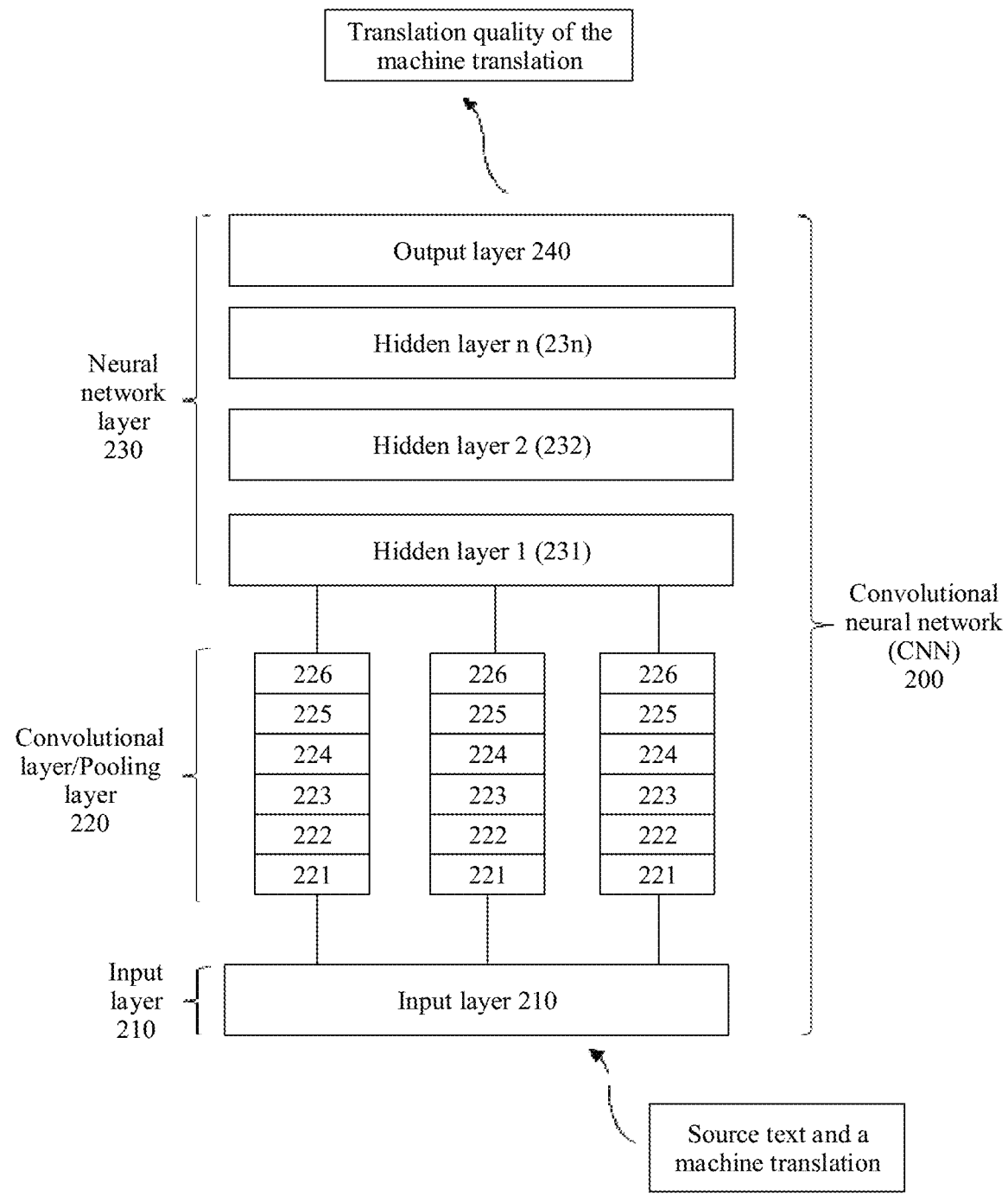
FIG. 6 is another schematic diagram of performing translation quality detection based on a CNN model according to an embodiment of this application.

As shown in FIG. 6, a convolutional neural network (CNN) 200 may include an input layer 210, a convolutional layer/pooling layer 220 (the pooling layer is optional), and a neural network layer 230. In FIG. 6, at the convolutional layer/pooling layer 220, a plurality of convolutional layers/pooling layers are in parallel, and extracted features are input to the neural network layer 230 for processing.

Figure 7:
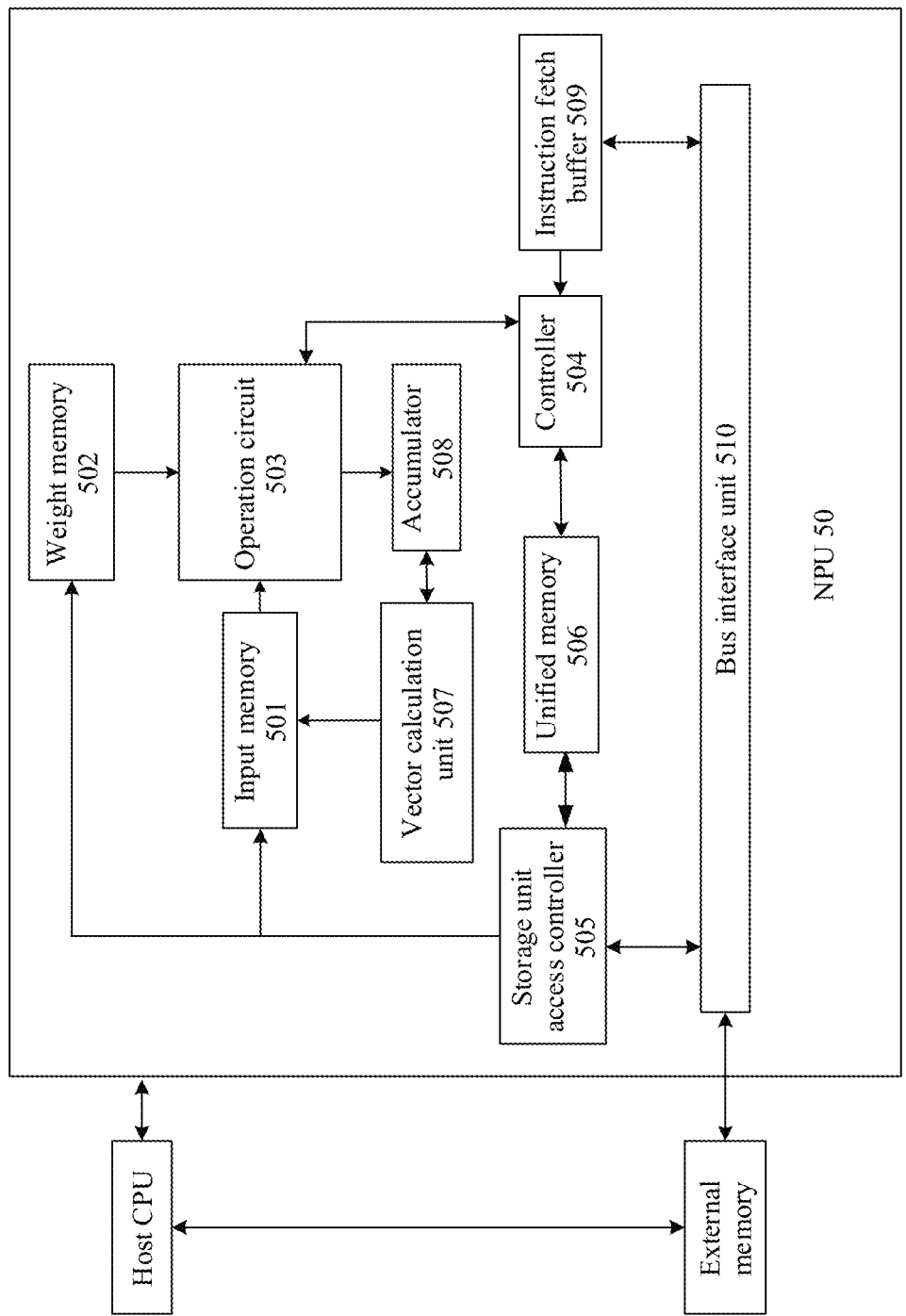
FIG. 7 is a schematic diagram of a hardware structure of a chip according to an embodiment of this application.

FIG. 7 is a schematic diagram of a hardware structure of a chip according to an embodiment of this application. The chip includes a neural network processing unit (neural network processing unit, NPU) 50. The chip may be disposed in the execution device 110 shown in FIG. 4, and is configured to complete computing work of the computing module 111. The chip may alternatively be disposed in the training device 120 shown in FIG. 4, and is configured to complete training work of the training device 120 and output the target module/rule 101. Algorithms at all layers of the convolutional neural network shown in FIG. 5 and FIG. 6 may be implemented in the chip shown in FIG. 7.

A translation quality detection method according to an embodiment of this application may specifically be performed by an operation circuit 503 and/or a vector calculation unit 507 in the NPU 50, to obtain translation quality of a machine translation.

The following briefly describes modules and units in the NPU 50.

The NPU 50 serves as a coprocessor, and may be disposed on a host CPU (host CPU). The host CPU assigns a task. A core part of the NPU 50 is the operation circuit 503. When the NPU 50 works, a controller 504 in the NPU 50 may control the operation circuit 503 to extract data from a memory (a weight memory or an input memory) and perform an operation.

In some implementations, the operation circuit 503 includes a plurality of processing units (process engine, PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and buffers the data on each PE in the operation circuit. The operation circuit fetches data of the matrix A from an input memory 501, to perform a matrix operation on the matrix B, and stores an obtained partial result or an obtained final result of the matrix into an accumulator (accumulator) 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling (pooling), batch normalization (batch normalization), or local response normalization (local response normalization), at a non-convolutional/non-fully connected layer (fully connected layer, FC) of a neural network.

In some implementations, the vector calculation unit 507 can store a processed output vector in a unified memory 506. For example, the vector calculation unit 507 can apply a non-linear function to an output of the operation circuit 503, for example, a vector of an accumulated value, used to generate an activated value. In some implementations, the vector calculation unit 507 generates a normalized value, a combined value, or both. In some implementations, the processed output vector can be used as an activated input to the operation circuit 503, for example, the processed output vector can be used at a subsequent layer of the neural network.

The unified memory 506 is configured to store input data and output data.

A storage unit access controller (direct memory access controller, DMAC) 505 directly transfer weight data to the input memory 501 and/or the unified memory 506, stores weight data in an external memory in the weight memory 502, and stores data in the unified memory 506 in the external memory.

A bus interface unit (bus interface unit, BIU) 510 is configured to implement interaction between the host CPU, the DMAC, and an instruction fetch buffer 509 by using a bus.

The instruction fetch buffer (instruction fetch buffer) 509 connected to the controller 504 is configured to store an instruction used by the controller 504.

The controller 504 is configured to invoke the instruction buffered in the instruction fetch buffer 509, to control a working process of an operation accelerator.

Usually, the unified memory 506, the input memory 501, the weight memory 502, and the instruction fetch buffer 509 may all be on-chip (on-chip) memories. The external memory of the NPU may be a memory outside the NPU, and the external memory may be a double data rate synchronous dynamic random access memory (double data rate synchronous dynamic random access memory, DDR SDRAM), a high bandwidth memory (high bandwidth memory, HBM), or another readable and writable memory.

The following describes a translation quality detection method according to an embodiment of this application in detail with reference to the accompanying drawings. The quality detection method in this embodiment of this application may be performed by devices such as the data processing device in FIG. 1, the user equipment in FIG. 2, the execution device 110 in FIG. 3, and the execution device 110 in FIG. 4.

Figure 8:
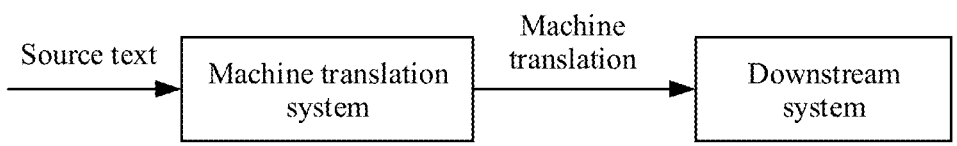
FIG. 8 is a schematic diagram of an application scenario according to an embodiment of this application.

FIG. 8 is a schematic diagram of an application scenario according to an embodiment of this application. As shown in FIG. 8, a machine translation can be obtained after a machine translation system translates a source text, and the machine translation may be sent to a downstream system for processing. According to the translation quality detection method in this embodiment of this application, translation quality of the machine translation can be detected or evaluated (before the machine translation is sent to the downstream system for processing), to obtain the translation quality of the machine translation. It helps determine, based on the quality of the machine translation, whether to send the machine translation to the downstream system for processing.

Figure 9:
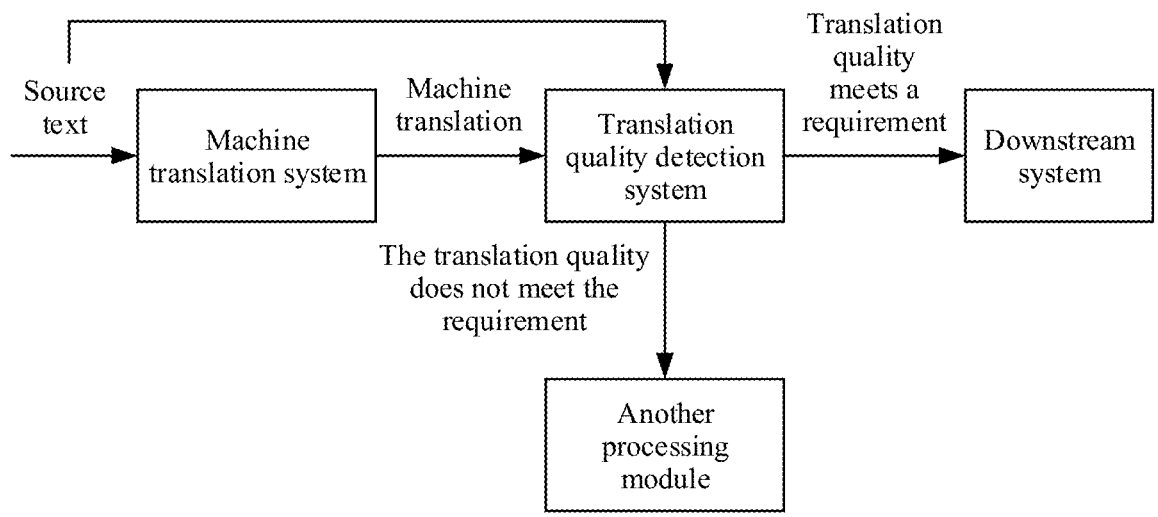
FIG. 9 is a schematic diagram of a translation quality detection process according to an embodiment of this application.

FIG. 9 is a schematic diagram of a translation quality detection process according to an embodiment of this application. As shown in FIG. 9, a machine translation system performs machine translation on a source text to obtain a machine translation. Then, the machine translation and the source text are sent to a translation quality detection system for quality detection, to determine translation quality of the machine translation. When the translation quality of the machine translation meets a requirement (for example, the translation quality of the machine translation is relatively good), the machine translation may be sent to a downstream system for processing. When the translation quality of the machine translation does not meet the requirement (for example, the translation quality of the machine translation is relatively poor), the machine translation may be sent to another processing module for other processing (for example, the machine translation may be discarded).

The translation quality of the machine translation is usually closely related to a specific application scenario of the machine translation. When a same machine translation faces different downstream tasks (a task in which the downstream system processes the machine translation may be referred to as a downstream task), acceptability of the machine translation may be different. In other words, a translation quality standard of the machine translation is related to a specific application scenario of the machine translation. Therefore, in this embodiment of this application, determining the translation quality of the machine translation can be more targeted with reference to the application scenario of the machine translation.

Figure 10:
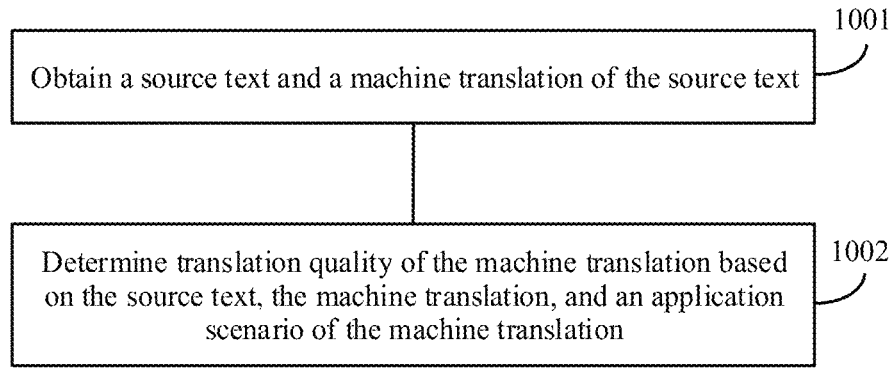
FIG. 10 is a schematic flowchart of a translation quality detection method according to an embodiment of this application.

FIG. 10 is a schematic flowchart of a translation quality detection method according to an embodiment of this application. The quality detection method shown in FIG. 10 may be performed by a translation quality detection system (which may specifically be the translation quality detection system in FIG. 9). The translation quality detection system may specifically be the data processing device in FIG. 1, the user equipment in FIG. 2, the execution device 110 in FIG. 3, or the execution device 110 in FIG. 4. The method shown in FIG. 10 includes step 1001 and step 1002. The following describes the two steps in detail.

1001: Obtain a source text and a machine translation.

The machine translation is a translation obtained after a machine translation system translates the source text. In other words, the machine translation is a translation obtained after the machine translation system performs machine translation on the source text.

When the method shown in FIG. 10 is performed by the translation quality detection system shown in FIG. 9, the machine translation in step 1001 may be a translation obtained after the machine translation system in FIG. 9 performs machine translation.

Both the source text and the machine translation may belong to a natural language that generally evolves with a culture in a natural way.

The source text may be a segment of text written in a natural language. For example, the source text may be a segment of English, Chinese, or the like.

Optionally, the source text belongs to a first natural language, the machine translation belongs to a second natural language, and the first language and the second language are different natural languages.

It should be understood that the source text belongs to a first natural language may mean that the source text is a segment of text expressed by using the first natural language, and that the machine translation belongs to a second natural language may mean that the machine translation is a segment of text expressed by using the second natural language. The source text and the machine translation may belong to any two different natural languages.

For example, the source text may be a segment of Chinese, and the machine translation of the source text may be a segment of English (the machine translation system translates the segment of Chinese to obtain the segment of English).

For another example, the source text may be a segment of Chinese, and the machine translation of the source text may be a segment of Japanese (the machine translation system translates the segment of Chinese to obtain the segment of Japanese).

1002: Determine translation quality of the machine translation based on the source text, the machine translation, and an application scenario of the machine translation.

When the method shown in FIG. 10 is performed by the translation quality detection system shown in FIG. 9, the downstream system can reflect the application scenario of the machine translation. The application scenario of the machine translation in step 1002 may be an application scenario of a downstream system that subsequently processes the machine translation, and the application scenario of the downstream system may specifically be a processing task of the downstream system.

For example, the processing task of the downstream system may be one or more of purposes such as sentiment classification, spam detection, intent recognition, and named entity recognition.

Named entity recognition (named entity recognition, NER) may also be referred to as "name recognition", and specifically refers to recognizing an entity with a specific meaning in a text, where the entity mainly includes a person name, a place name, an organization name, a proper noun, and the like.

In this application, the translation quality of the machine translation is determined with reference to the application scenario of the machine translation, so that translation quality detection of the machine translation can be more targeted and therefore efficient.

Optionally, that the translation quality of the machine translation is determined based on the source text, the machine translation, and the application scenario of the machine translation in step 1002 specifically includes: processing the source text and the machine translation by using a translation quality detection model corresponding to the downstream system, to obtain the translation quality of the machine translation.

The downstream system is configured to subsequently process the machine translation, and the downstream system can reflect the application scenario of the machine translation. Therefore, when the source text and the machine translation are processed based on the translation quality detection model corresponding to the downstream system, the application scenario of the machine translation is considered.

The translation quality detection model corresponding to the downstream system may be obtained through training based on a training sample and a training target, where the training sample includes a training source text and a training machine translation, and the training target includes translation quality of the training machine translation.

The training machine translation may be a translation obtained after the machine translation system translates the training source text. The training machine translation is a translation obtained after the machine translation system performs machine translation on the training source text, and the translation quality of the training machine translation may be determined based on a processing result obtained after the downstream system processes the training machine translation and a processing result obtained after the downstream system processes a reference translation of the training source text.

Specifically, the translation quality of the training machine translation may be determined based on a difference between the processing result obtained after the downstream system processes the training machine translation and the processing result obtained after the downstream system processes the reference translation of the training source text. In other words, the translation quality of the training machine translation may be determined based on a difference between the processing result obtained after the downstream system processes the training machine translation and the processing result obtained after the downstream system processes the reference translation of the training source text.

Further, the translation quality of the training machine translation may be determined based on a difference between a first processing result and a second processing result. In other words, the translation quality of the training machine translation may be determined based on the difference between the first processing result and the second processing result, where the first processing result is the processing result obtained after the downstream system processes the training machine translation, and the second processing result is the processing result obtained after the downstream system processes the reference translation of the training source text.

For example, when the difference between the first processing result and the second processing result is relatively small, the translation quality of the training machine translation is relatively good. When the difference between the first processing result and the second processing result is relatively large, the translation quality of the training machine translation is relatively poor.

The translation quality detection model corresponding to the downstream system may be a pre-trained model. During detection of the translation quality, the translation quality detection model corresponding to the downstream system (which subsequently processes the machine translation) is used to detect the translation quality.

The training source text, the training machine translation, and the translation quality of the training machine translation may be collectively referred to as training data. The translation quality detection model is trained by using the training data, to obtain a model parameter of the translation quality detection model and a trained translation quality detection model. The trained translation quality detection model may process the source text and the machine translation, to obtain the translation quality of the machine translation.

The training source text and the training machine translation may be referred to as training input data. When the translation quality detection model is trained, the training input data is input, so that an output of the translation quality detection model is close to a training target as much as possible. In addition, when a difference between the output of the translation quality detection model and the training target meets a preset requirement (for example, the difference between the output of the translation quality detection model and the training target is less than a preset threshold), the model parameter is determined as a final model parameter of the translation quality detection model.

Optionally, the training source text and the reference translation of the training source text come from a known bilingual parallel corpus.

The known bilingual parallel corpus may come from a bilingual parallel corpus stored locally, or may come from a bilingual parallel corpus stored on a cloud.

The source text and the reference translation of the source text are obtained from the known bilingual parallel corpus. This reduces difficulty in obtaining the training data and further simplifies a process of obtaining the translation quality detection model based on the training data.

Optionally, the reference translation of the training source text is a manually edited translation.

Usually, because an editor has an ability to ensure precision of a reference translation. When quantities of reference translations are the same, a more precise reference translation can make the translation quality detection model more accurate. Therefore, after the training source text is obtained, the reference translation of the training source text is obtained through manual editing, so that a precise reference translation can be obtained. This helps obtain a more accurate translation quality detection model subsequently.

In this application, the translation quality detection model may be obtained through training based on the training data. The training data includes the training source text, the training machine translation, and the translation quality of the training machine translation. The following briefly describes a process of obtaining the training data with reference to the accompanying drawings.

Figure 11:
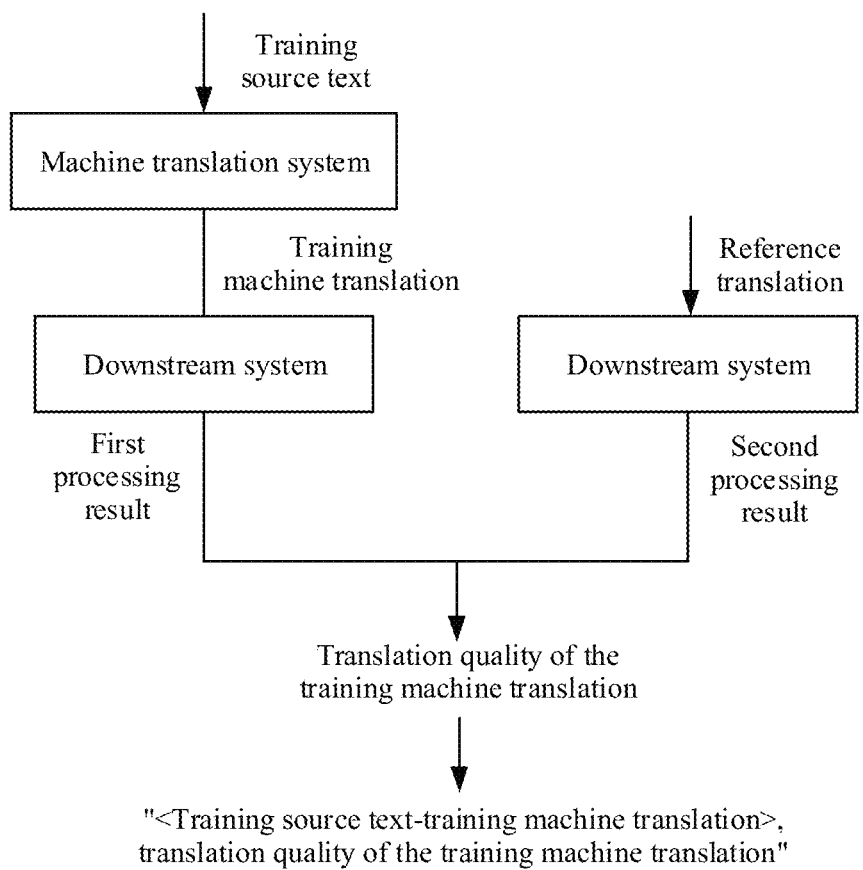
FIG. 11 is a schematic diagram of a process of obtaining training data according to an embodiment of this application.

FIG. 11 is a schematic diagram of a process of obtaining training data according to an embodiment of this application.

As shown in FIG. 11, a machine translation system performs machine translation on a training source text, to obtain a training machine translation, and a downstream system processes the training machine translation, to obtain a first processing result. In addition, the downstream system further processes a reference translation of the training source text, to obtain a second processing result. Then, translation quality of the training machine translation may be determined based on a difference between the first processing result and the second processing result.

Specifically, the downstream system, or another device or apparatus other than the downstream system may determine the translation quality of the training machine translation based on the difference between the first processing result and the second processing result.

The training source text and the reference translation of the training source text in FIG. 11 may come from a known bilingual parallel corpus, and the training source text may include a plurality of segments of texts (in this case, the reference translation of the training source text integrates reference translations corresponding to the plurality of segments of texts).

Because the training source text usually includes a large amount of data, a large amount of training data can be obtained through the process shown in FIG. 11. The training data may be represented as "<training source text-training machine translation>, translation quality of the training machine translation", and the training data may be used in subsequent training of the translation quality detection model.

After the training data is obtained through the process shown in FIG. 11, the translation quality detection model may be trained, and is used to detect the translation quality subsequently, to determine the translation quality of the machine translation.

The following describes, with reference to Example 1 and Example 2, how to determine the translation quality of the training translation, so as to obtain the training data.

Example 1

The downstream system executes a subjective classification task.

In Example 1, a source text 1 and a reference translation of the source text 1 are as follows:

The source text 1: Wo Yi Wei Zuo Tian Ye Li Xia Yu Le.

The reference translation of the source text 1: I thought it rained last night.

A processing result obtained after the downstream system processes the reference translation of the source text 1 is as follows:

The reference translation of the source text 1: I thought it rained last night. (Classification result: subjective)

Specifically, the machine translation system performs machine translation on the source text 1, to obtain a machine translation 1a or a machine translation 1b. The two machine translations are specifically shown as follows:

The machine translation 1a: I thought it rained yesterday.
The machine translation 1b: It rained last night.

The downstream system is used to process the machine translation 1a and the machine translation 1b, and obtained specific processing results and acceptability annotation information are as follows:

The machine translation 1a: I thought it rained yesterday. (Classification result: subjective; and acceptability annotation: acceptable)

The machine translation 1b: It rained last night. (Classification result: objective; and acceptability annotation: unacceptable)

The processing result obtained after the downstream system processes the machine translation 1a is subjective, and is the same as the processing result of the reference translation of the source text 1. It may be considered that translation quality of the machine translation 1a meets a requirement, and the translation quality of the machine translation 1a is acceptable.

The processing result obtained after the downstream system processes the machine translation 1b is objective, and is different from the processing result of the reference translation of the source text 1. It may be considered that translation quality of the machine translation 1b does not meet the requirement, and the translation quality of the machine translation 1b is unacceptable.

The following training data may be obtained through the foregoing processing:

"<source text 1 machine translation 1a>, acceptable"; and
"<source text 1 machine translation 1b>, unacceptable".

In the foregoing example, "Ye Li" is not translated in the machine translation 1a, but the subsequent classification result is not affected. The classification result of the machine translation 1a processed by the downstream system is still subjective, and the classification result of the machine translation 1a is the same as the classification result of the reference translation of the source text 1. Therefore, the machine translation 1a is acceptable for the classification task of the downstream system.

However, because "Wo Yi Wei" is not translated in the machine translation 1b, the classification result of the machine translation 1b processed by the downstream system is objective, and is different from the classification result of the reference translation of the source text 1. Therefore, the machine translation 1b is unacceptable.

Example 1 describes the process of obtaining data by using an example in which the downstream system executes the subjective classification task. With reference to Example 2, the following describes the process of obtaining data by using an example in which the downstream system performs named entity recognition.

Example 2

The downstream system performs named entity recognition.

In Example 2, a source text 2 and a reference translation of the source text 2 are as follows:

The source text 2: Bu Shi Yu Sha Long Zai Niu Yue Jin Xing Hui Tan.

The reference translation of the source text 2: Bush held a talk with Sharon in New York.

A recognition result obtained after the downstream system performs named entity recognition on the reference translation of the source text 2 is: "named entities: Bush, Sharon, and New York".

The machine translation system performs machine translation on the source text 2, to obtain any one of a machine translation 2a, machine translation 2b, and a machine translation 2c. The machine translations are specifically shown as follows:

The machine translation 2a: Bush and Sharon in New York.

The machine translation 2b: Bush gave a talk at a salon in New York.

The machine translation 2c: Bush held a talk with Shalong in New York.

Recognition results obtained after the downstream system processes the three machine translations and acceptability annotation information of the three machine translations are as follows:

The machine translation 2a: Bush and Sharon in New York. (Named entities: Bush, Sharon, and New York; and acceptability annotation: acceptable)

The machine translation 2b: Bush gave a talk at a salon in New York. (Named entities: Bush and New York; and acceptability annotation: unacceptable)

The machine translation 2c: Bush held a talk with Shalong in New York. (Named entities: Bush, Shalong, and New York; and acceptability annotation: unacceptable)

There are three named entities in the reference translation based on the recognition result obtained after the downstream system performs named entity recognition on the reference translation of the source text 2. In the machine translation 2a, three named entities are correctly translated, so that the machine translation 2a may be annotated as acceptable. In the machine translation 2b, the named entity "Sha Long" is not translated, so that the machine translation 2b may be annotated as unacceptable. In the machine translation 2c, the named entity "Sha Long" is translated incorrectly, so that the machine translation 2c may be annotated as unacceptable. In this way, three pieces of training data can be obtained after annotation and are specifically shown as follows:

"<source text 2 machine translation 2a>, acceptable";
"<source text 2 machine translation 2b>, unacceptable"; and
"<source text 2 machine translation 2c>, unacceptable".

In the foregoing example, whether each of the machine translation 2a, the machine translation 2b, and the machine translation 2c is acceptable is determined based on an acceptable criterion that the result of the reference translation obtained from the downstream system is the same as the result of the machine translation obtained from the downstream system.

Actually, an acceptable criterion for a machine translation may alternatively be determined based on an actual situation. For example, if omission of a named entity in a translation is unacceptable, and a mistranslation of the named entity is acceptable, whether a translation is acceptable may be determined based on a quantity of elements in a named entity set. In this case, after named entity recognition is separately performed on the machine translation 2a and the machine translation 2c, three named entities are obtained. Therefore, both the machine translation 2a and the machine translation 2c can be annotated as acceptable. In this way, three pieces of training data are obtained after annotation and are specifically shown as follows:

"<source text 2 machine translation 2a>, acceptable";
"<source text 2 machine translation 2b>, unacceptable"; and
"<source text 2 machine translation 2c>, acceptable".

It should be understood that Example 1 and Example 2 are described by using an example in which translation quality of a machine translation is represented by acceptability of the machine translation. Actually, translation quality of a machine translation may also have a plurality of representation forms, and a specific representation form of a machine translation is not limited herein.

Figure 12:
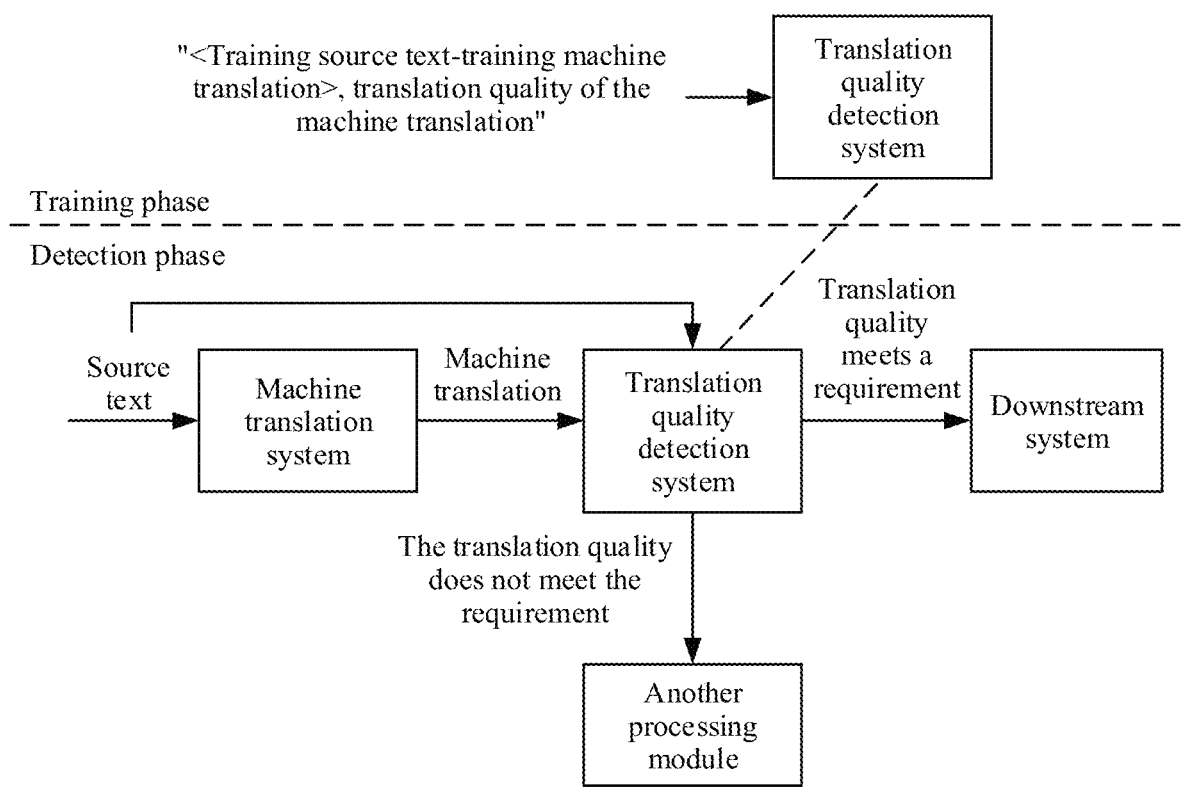
FIG. 12 is a schematic diagram of a translation quality detection process according to an embodiment of this application.

FIG. 12 is a schematic diagram of a translation quality detection process according to an embodiment of this application.

The process shown in FIG. 12 may be divided into two phases: a training phase and a detection phase. In the training phase, after training data "<training source text-training machine translation>, translation quality of the training machine translation" is obtained, a translation quality detection model of a translation quality detection system is trained based on the training data. Then, after the translation quality detection model is trained, the translation quality detection system may be used to perform translation quality detection.

It should be understood that, as shown in FIG. 12, the training data used in the training phase corresponds to a downstream system in the following detection phase. In other words, the translation quality of the training machine translation in the training data is determined based on a difference between a processing result obtained after the downstream system processes the training machine translation and a processing result obtained after the downstream system processes a reference translation of the training source text.

In the detection phase, a machine translation system performs machine translation on a source text to obtain a machine translation, and the translation quality detection system determines translation quality of the machine translation based on the source text and the machine translation. When the translation quality of the machine translation meets a requirement (for example, the translation quality of the machine translation is acceptable), the machine translation may be sent to the downstream system for processing. When the translation quality of the machine translation does not meet the requirement (for example, the translation quality of the machine translation is unacceptable), the machine translation may be sent to another processing module for other processing.

In this application, the translation quality of the machine translation may have a plurality of representation forms. The following describes several possible representation forms of the translation quality of the machine translation.

Optionally, the translation quality of the machine translation may be any one of the following information:

(1) acceptability information of the machine translation; and (2) a difference value between the machine translation and a standard reference translation.

The acceptability information of the machine translation may be used to indicate whether the machine translation is acceptable, and may also be used to indicate a probability that the machine translation is accepted or a probability that the machine translation is not accepted.

When the acceptability information of the machine translation is used to indicate whether the machine translation is acceptable, the acceptability information of the machine translation may include a flag bit, and a value of the flag bit is used to indicate whether the machine translation is acceptable. For example, when the value of the flag bit is 1, it indicates that the machine translation is acceptable (the machine translation may be sent to the downstream system for processing). When the value of the flag bit is 0, it indicates that the machine translation cannot be accepted or the machine translation is not acceptable (in this case, the machine translation cannot be sent to the downstream system for processing).

When the acceptability information of the machine translation is used to indicate the probability that the machine translation is accepted or the probability that the machine translation is not accepted, the acceptability information of the machine translation may specifically be a value of the probability that the machine translation is accepted or a value of the probability that the machine translation is not accepted.

When the acceptability information of the machine translation is used to indicate the probability that the machine translation is accepted, if the probability that the machine translation is accepted is greater than a preset value, the machine translation may be sent to the downstream system for subsequent processing; otherwise, the machine translation cannot be sent to the downstream system for subsequent processing.

For example, when the probability that the machine translation is accepted is 85%, and 85% is greater than 80% (80% is merely an example for description herein, and the preset value may alternatively be another value), the machine translation may be sent to the downstream system for subsequent processing.

The translation quality detection model in this application has a plurality of possible implementations. Usually, any model that can extract features from input sentences in two languages and perform binary classification can be used.

Optionally, the translation quality detection model may be a neural network model, or may be a model based on a support vector machine.

When the translation quality detection model is a neural network model, because the neural network model has a strong capability of data processing, a processing effect of processing a source text and a machine translation is better.

With reference to a specific example, the following describes a process in which the translation quality detection model processes a source text and a machine translation, to obtain translation quality of the machine translation.

Figure 13:
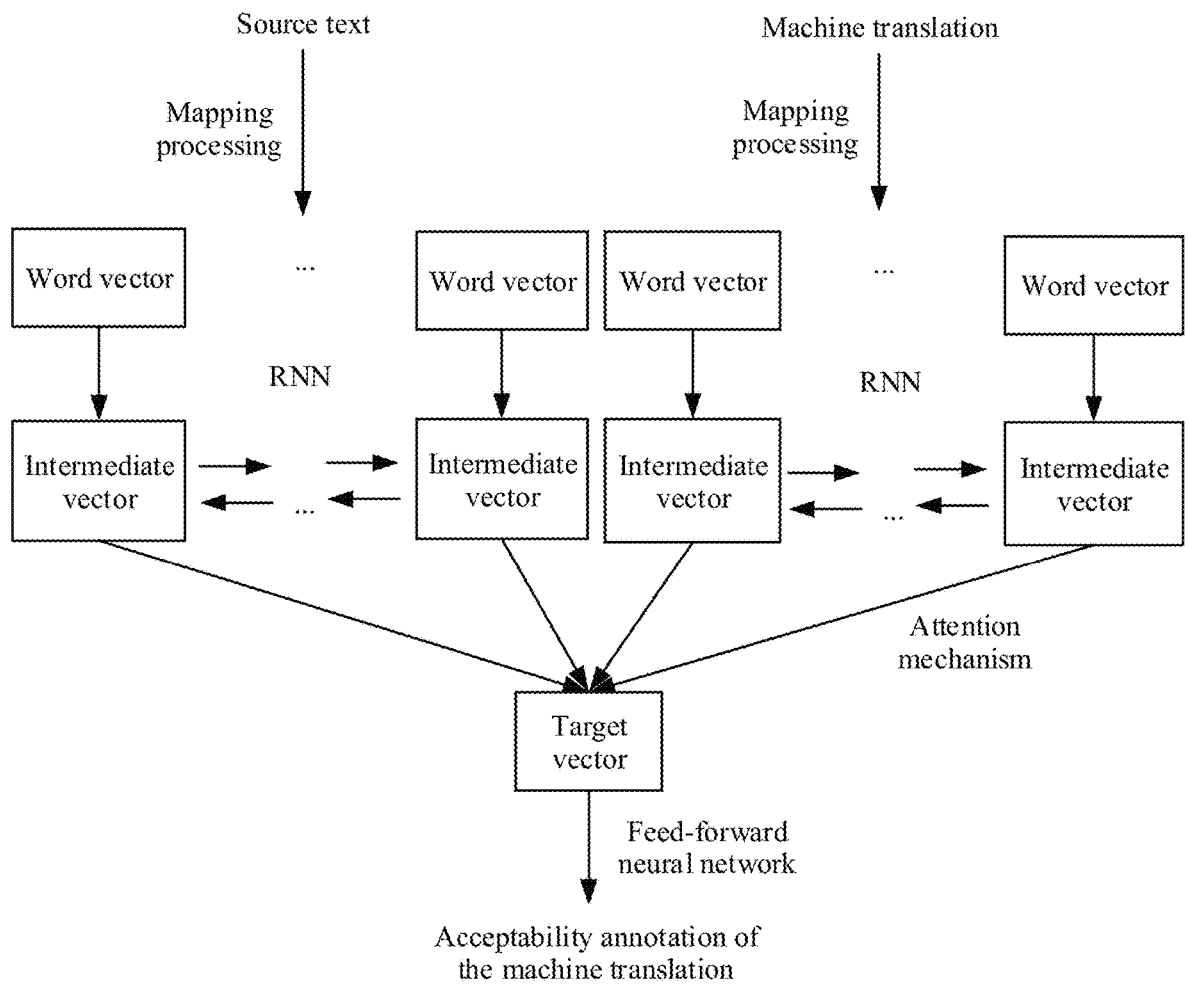
FIG. 13 is a schematic diagram of a translation quality detection process according to an embodiment of this application.

FIG. 13 shows a process in which the translation quality detection model process a source text and a machine translation.

In FIG. 13, after a source text and a machine translation are obtained, each word in the source text and the machine translation may be mapped to a word vector (word embedding), and then a bidirectional recurrent neural network (recurrent neural network, RNN) processes the word vector of the source text and the word vector of the machine translation, to obtain an intermediate vector of the source text and an intermediate vector of the machine translation. Then, an attention mechanism (attention mechanism) is used to process the intermediate vector of the source text and the intermediate vector of the machine translation, to obtain a target vector. Finally, a feed-forward neural network (feed-forward neural network) is used to process the target vector, to obtain an estimate of whether the machine translation is acceptable for the source text. A network unit in the RNN may be a gated recurrent unit (gated recurrent unit, GRU).

The foregoing calculation process may be simplified as follows: The source text and the machine translation are substituted into a function $f(x, z; \phi)$, to obtain translation quality of the machine translation, where x represents the source text, z represents the machine translation, and $\phi$ is a parameter in the translation quality detection model, and includes a word vector parameter, a recurrent neural network parameter, an attention mechanism parameter, and a feed-forward neural network parameter. When the translation quality detection model is obtained, an acceptability annotation corpus $\{x_i, z_i, y_i\}_{i=1}^{m}$ may be used as a training data set, and training is performed by using a backpropagation (backpropagation) algorithm, to obtain the translation quality detection model. m represents a quantity of entries of the acceptability annotation corpus, $x_i$ is an $i^{th}$ source text, $z_i$, is an $i^{th}$ machine translation ($z_i$ is a machine translation obtained by performing machine translation on $x_i$), and $y_i$ is an acceptability annotation of $z_i$ (in this case, the translation quality of the machine translation in the training data set is represented by the acceptability annotation).

Figure 14:
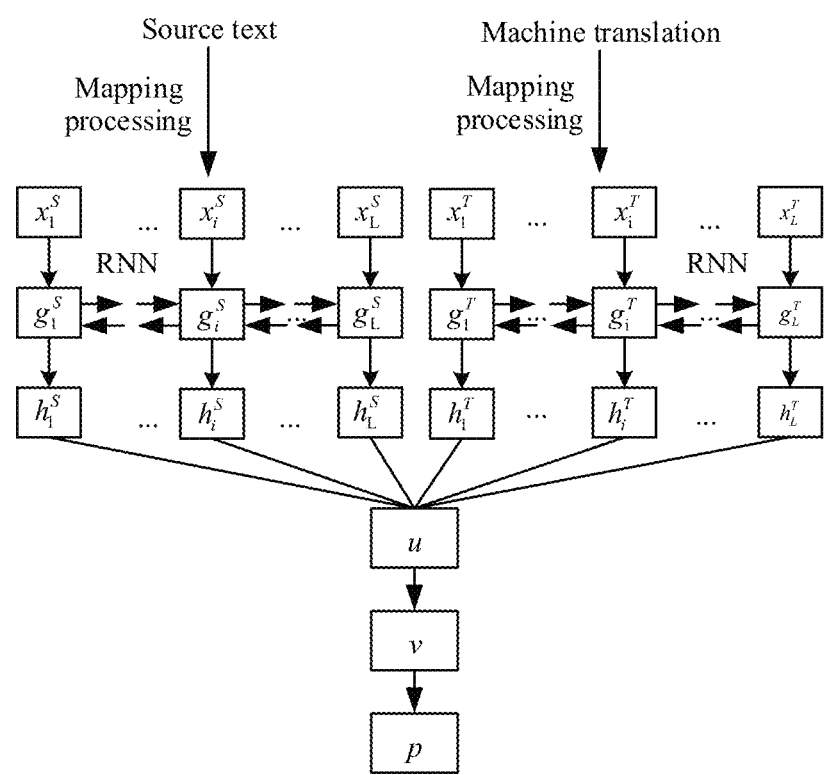
FIG. 14 is a schematic diagram of a translation quality detection process according to an embodiment of this application.

With reference to FIG. 14, the following describes in detail the process in which the translation quality detection model processes a source text and a machine translation.

As shown in FIG. 14, processing of a source text and a machine translation by the translation quality detection model specifically includes the following steps.

Each word in a source text s and a machine translation t is mapped to a word vector (word embedding).

A formula (1) may be used to obtain the word vector of each word in the source text s, and a formula (2) may be used to obtain the word vector of each word in the machine translation t.

$$x_i^S = w_e^S s_i, 1 \leq i \leq L \quad (1)$$

$$x_i^T = w_e^T t_i, 1 \leq i \leq L \quad (2)$$

$x_i^S$ represents an $i^{th}$ word vector in the source text s, $w_e^S$ represents a word vector parameter matrix of a source language, $s_i$ represents a vector that is represented in a one-hot form by an $i^{th}$ word in the source text s (only one feature of the vector is not 0, and another feature of the vector is 0), $x_i^T$ represents an $i^{th}$ word vector in the machine translation t, $w_e^T$ represents a word vector parameter matrix of a target language, and $t_i$ represents a vector that is represented in a one-hot form by an $i^{th}$ word in the machine translation t.

The RNN is used to process the word vector of each word in the source text s and the word vector of each word in the machine translation t, to obtain a first intermediate vector of the source text s and a second intermediate vector of the machine translation t.

A formula (3) may be used to process the word vector of each word in the source text s, and a formula (4) may be used to process the word vector of each word in the machine translation t.

$$g_i^S = BiGRU^S(x_i^S), 1 \leq i \leq L \quad (3)$$

$$g_i^T = BiGRU^T(x_i^T), 1 \leq i \leq L \quad (4)$$

In the foregoing formulas (3) and (4), $g_i^S$ represents the first intermediate vector of the source text s, $BiGRU^S$ represents an operation performed by a bidirectional GRU network of the source language on the word vector of the source text, $g_i^T$ represents the second intermediate vector of the machine translation t, and $BiGRU^T$ represents an operation performed by a bidirectional GRU network of the target language on the word vector of the machine translation.

Nonlinear processing is performed, by using a non-linear layer, on the first intermediate vector that is of the source text s, to obtain a third intermediate vector.

A formula (5) may be used to perform nonlinear processing on the first intermediate vector, to obtain the third intermediate vector.

$$h_i^S = ReLU(W_g^S g_i^S + b_g^S), 1 \leq i \leq L \quad (5)$$

$h_i^S$ represents the third intermediate vector, ReLU is a nonlinear activation function, $W_g^S$ represents a parameter matrix, and $b_g^S$ represents a parameter vector.

Nonlinear processing is performed, by using the nonlinear layer, on the second intermediate vector that is of the machine translation t, to obtain a fourth intermediate vector.

$$h_i^T = \text{ReLU}(W_g^T g_i^T + b_g^T), \ 1 \leq i \leq L \qquad (6)$$

$h_i^T$ represents the fourth intermediate vector, ReLU is a nonlinear activation function, $W_g^T$ represents a parameter matrix, and $b_g^T$ represents a parameter vector.

An attention mechanism is used to process two groups of intermediate vectors to obtain a target vector.

Specifically, the two groups of intermediate vectors, $\{h_i^S\}_{i=1}^L$ and $\{h_i^T\}_{i=1}^L$, that are obtained as discussed, may be combined and represented as $\{h_i\}_{i=1}^{2L}$, and then the target vector is obtained by using a formula (7) and a formula (8).

$$\alpha_i^T = \frac{\exp(h_i^T w)}{\sum_{j=1}^{2L} \exp(h_j^T w)}, \ 1 \leq i \leq 2L \qquad (7)$$

$$u = \sum_{i=1}^{2L} \alpha_i h_i \qquad (8)$$

w represents a parameter vector.

The target vector is processed by using the nonlinear layer and a linear layer, to obtain an estimate of whether the machine translation is acceptable for the source text.

The estimate of whether the machine translation is acceptable for the source text may be calculated according to formulas (9) and (10).

$$v = \text{ReLU}(W_u u + b_u) \qquad (9)$$

$$p = \text{sigmoid}(W_v v + b_v) \qquad (10)$$

$W_u$ and $W_v$ represent two parameter matrices, and $b_u$ and $b_v$ represent two parameter vectors.

The foregoing describes in detail the translation quality detection method in the embodiments of this application with reference to the accompanying drawings. The following describes a translation quality detection apparatus in the embodiments of this application with reference to FIG. 15. It should be understood that a translation quality detection apparatus 3000 described in FIG. 15 can perform the steps of the translation quality detection method in the embodiments of this application. The following appropriately omits repeated descriptions when describing the translation quality detection apparatus in the embodiments of this application.

Figure 15:
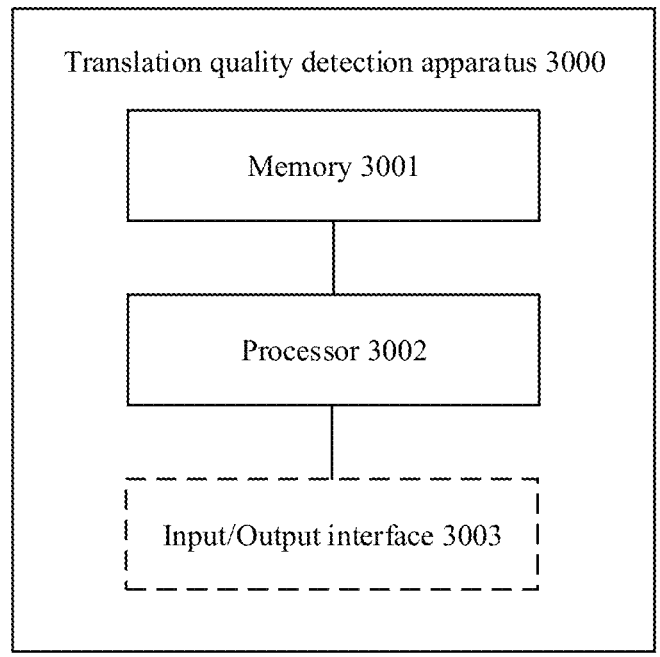
FIG. 15 is a schematic block diagram of a translation quality detection apparatus according to an embodiment of this application.

The translation quality detection apparatus 3000 shown in FIG. 15 includes:

a memory 3001, configured to store a program; and a processor 3002, configured to execute the program stored in the memory, where when the program stored in the memory is executed by the processor 3002, the processor 3002 is configured to:

obtain a source text and a machine translation, where the machine translation is a translation obtained after a machine translation system translates the source text; and determine translation quality of the machine translation based on the source text, the machine translation, and an application scenario of the machine translation.

It should be understood that, in addition to the memory 3001 and the processor 3002, the translation quality detection apparatus 3000 may further include an input/output interface 3003. The source text and the machine translation may be obtained from another device (for example, the machine translation system) through the input/output interface 3003. After the source text and the machine translation are obtained, the processor 3002 may be used to process the source text and the machine translation, to obtain translation quality of the machine translation. Further, after obtaining the translation quality of the machine translation, the translation quality detection apparatus 3000 may further transmit the translation quality of the machine translation to another device (for example, a downstream system) through the input/output interface 3003.

The translation quality detection apparatus 3000 is equivalent to the translation quality detection system shown in FIG. 9 and FIG. 12, and may be configured to detect the translation quality of the machine translation obtained through translation by the machine translation system.

The translation quality detection apparatus 3000 may be equivalent to the data processing device shown in FIG. 1 or the user equipment shown in FIG. 2. The translation quality detection apparatus 3000 may be equivalent to the execution device 110 shown in FIG. 3 or the execution device 110 shown in FIG. 4.

Figure 16:
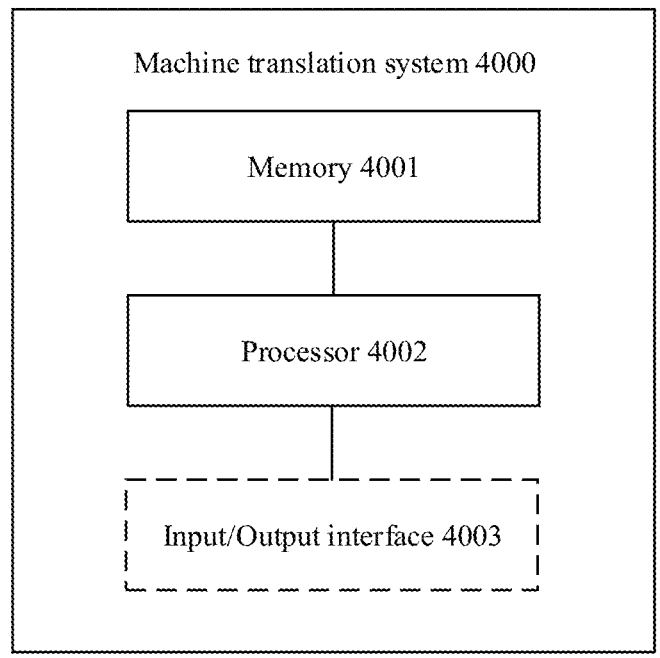
FIG. 16 is a schematic block diagram of a machine translation system according to an embodiment of this application.

FIG. 16 is a schematic block diagram of a machine translation system according to an embodiment of this application.

A machine translation system 4000 shown in FIG. 16 includes:

a memory 4001, configured to store a program; and a processor 4002, configured to execute the program stored in the memory, where when the program stored in the memory is executed by the processor 4002, the processor 4002 is configured to:

obtain a source text;

translate the source text to obtain a machine translation of the source text; and determine translation quality of the machine translation based on the source text, the machine translation, and an application scenario of the machine translation.

The machine translation system 4000 may further include an input/output interface 4003. The machine translation system 4000 can obtain the source text through the input/output interface 4003. Specifically, the machine translation system 4000 may obtain the source text from another device (for example, a terminal device) through the input/output interface 4003. After the source text is obtained, the translation quality of the machine translation can be obtained through processing by the processor 4002. The machine translation system 4000 can transmit the translation quality of the machine translation to another device (for example, a downstream system) through the input/output interface 4003.

The machine translation system 4000 cannot only translate the source text, but also detect the machine translation obtained through translation by the machine translation system 4000, to obtain the translation quality of the machine translation. The machine translation system 4000 is equivalent to a combination of the machine translation system and the translation quality detection system shown in FIG. 9 and FIG. 12.

The machine translation system 4000 may be equivalent to the data processing device shown in FIG. 1 or the user equipment shown in FIG. 2. The machine translation system 4000 may be equivalent to the execution device 110 shown in FIG. 3 or the execution device 110 shown in FIG. 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A translation quality detection method, comprising:
   obtaining a source text and a machine translation of the source text, wherein the machine translation is obtained after a machine translation system translates the source text; and
   processing the source text, the machine translation, and an application scenario of the machine translation by using a translation quality detection model corresponding to a downstream system, to obtain a translation quality of the machine translation based on the source text, the machine translation, and the application scenario of the machine translation, wherein
   the downstream system is configured to perform subsequent processing on the machine translation, the translation quality detection model corresponding to the downstream system is obtained through training based on a training sample and a training target, the training sample comprises a training source text and a training machine translation, and the training target comprises a translation quality of the training machine translation,
   the training machine translation is obtained after the machine translation system translates the training source text, and the translation quality of the training machine translation is determined based on a difference between a first processing result and a second processing result, wherein the first processing result is obtained after the downstream system processes the training machine translation, and the second processing result is obtained after the downstream system processes a reference translation of the training source text,
   the translation quality of the machine translation is acceptability information of the machine translation,
   the acceptability information of the machine translation is used to indicate whether the machine translation is acceptable,
   the reference translation of the training source text is labeled as having a first translation type,
   the machine translation is labeled has having a second translation type,
   the acceptability information is generated in response to determining whether the first translation type is equal to the second translation type, and
   the first translation type and the second translation type indicate whether the reference translation and the machine translation are each one of a subjective translation or an objective translation.

2. The method according to claim 1, wherein the training source text and the reference translation of the training source text come from a known bilingual parallel corpus.

3. The method according to claim 1, wherein the translation quality detection model is a neural network model.

4. The method according to claim 1, wherein the acceptability information of the machine translation is used to indicate a probability that the machine translation is accepted or a probability that the machine translation is not accepted.

5. The method according to claim 1, wherein the acceptability information indicates the machine translation is acceptable in response to the first translation type being identical to the second translation type.

6. The method according to claim 1, wherein the acceptability information indicates the machine translation is unacceptable in response to the first translation type being different from the second translation type.

7. A translation quality detection apparatus, comprising:
   a processor; and a memory having instructions stored thereon that, when executed by the processor, cause the apparatus to:

obtain a source text and a machine translation of the source text, wherein the machine translation is obtained after a machine translation system translates the source text; and process the source text, the machine translation, and an application scenario of the machine translation by using a translation quality detection model corresponding to a downstream system, to obtain a translation quality of the machine translation based on the source text, the machine translation, and the application scenario of the machine translation, wherein the downstream system is configured to perform subsequent processing on the machine translation, the translation quality detection model corresponding to the downstream system is obtained through training based on a training sample and a training target, the training sample comprises a training source text and a training machine translation, and the training target comprises a translation quality of the training machine translation, the training machine translation is obtained after the machine translation system translates the training source text, and the translation quality of the training machine translation is determined based on a difference between a first processing result and a second processing result, wherein the first processing result is obtained after the downstream system processes the training machine translation, and the second processing result is obtained after the downstream system processes a reference translation of the training source text, the translation quality of the machine translation is acceptability information of the machine translation, the acceptability information of the machine translation is used to indicate whether the machine translation is acceptable, the reference translation of the training source text is labeled as having a first translation type, the machine translation is labeled has having a second translation type, the acceptability information is generated in response to determining whether the first translation type is equal to the second translation type, and the first translation type and the second translation type indicate whether the reference translation and the machine translation are each one of a subjective translation or an objective translation.

8. The apparatus according to claim 7, wherein the training source text and the reference translation of the training source text come from a known bilingual parallel corpus.

9. The apparatus according to claim 7, wherein the translation quality detection model is a neural network model.

10. The apparatus according to claim 7, wherein the acceptability information of the machine translation is used to indicate a probability that the machine translation is accepted or a probability that the machine translation is not accepted.

11. The apparatus according to claim 7, wherein the acceptability information indicates the machine translation is acceptable in response to the first translation type being identical to the second translation type.

12. The apparatus according to claim 7, wherein the acceptability information indicates the machine translation is unacceptable in response to the first translation type being different from the second translation type.

13. A non-transitory computer-readable storage medium having instructions stored thereon that, when executed by a processor, cause an apparatus to:

obtain a source text and a machine translation of the source text, wherein the machine translation is obtained after a machine translation system translates the source text; and process the source text, the machine translation, and an application scenario of the machine translation by using a translation quality detection model corresponding to a downstream system, to obtain a translation quality of the machine translation based on the source text, the machine translation, and the application scenario of the machine translation, wherein the downstream system is configured to perform subsequent processing on the machine translation, the translation quality detection model corresponding to the downstream system is obtained through training based on a training sample and a training target, the training sample comprises a training source text and a training machine translation, and the training target comprises a translation quality of the training machine translation, the training machine translation is obtained after the machine translation system translates the training source text, and the translation quality of the training machine translation is determined based on a difference between a first processing result and a second processing result, wherein the first processing result is obtained after the downstream system processes the training machine translation, and the second processing result is obtained after the downstream system processes a reference translation of the training source text, the translation quality of the machine translation is acceptability information of the machine translation, the acceptability information of the machine translation is used to indicate whether the machine translation is acceptable, the reference translation of the training source text is labeled as having a first translation type, the machine translation is labeled has having a second translation type, the acceptability information is generated in response to determining whether the first translation type is equal to the second translation type, and the first translation type and the second translation type indicate whether the reference translation and the machine translation are each one of a subjective translation or an objective translation.

14. The non-transitory computer-readable storage medium according to claim 13, wherein the training source text and the reference translation of the training source text come from a known bilingual parallel corpus.

15. The non-transitory computer-readable storage medium according to claim 13, wherein the acceptability information of the machine translation is used to indicate a probability that the machine translation is accepted or a probability that the machine translation is not accepted.

16. The non-transitory computer-readable storage medium according to claim 13, wherein the acceptability information indicates the machine translation is acceptable in response to the first translation type being identical to the second translation type.

17. The non-transitory computer-readable storage medium according to claim 13, wherein the acceptability information indicates the machine translation is unacceptable in response to the first translation type being different from the second translation type.

* * * * *

UNITED STATES PATENT AND TRADEMARK OFFICE
CERTIFICATE OF CORRECTION

PATENT NO. : 12,131,128 B2
APPLICATION NO. : 17/479420
DATED : October 29, 2024
INVENTOR(S) : Meng Zhang et al.

Page 1 of 1

It is certified that error appears in the above-identified patent and that said Letters Patent is hereby corrected as shown below:

In the Specification

The formula (1) in Column 24, Line 26 should be replaced with:

$$x_i^S = w_e^S s_i, \quad 1 \leq i \leq L \qquad (1)$$

Signed and Sealed this
Thirty-first Day of December, 2024

Derrick Brent
*Acting Director of the United States Patent and Trademark Office*